US012720045B2

(12) United States Patent
Heo et al.

(10) Patent No.: US 12,720,045 B2
(45) Date of Patent: Aug. 25, 2026

(54) METHOD FOR CONSTRUCTING MPM LIST IN INTRA PREDICTION

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Jin Heo, Yongin-si (KR); Seung Wook Park, Yongin-si (KR); Min Hun Lee, Uijeongbu-si (KR); Dong Gyu Sim, Seoul (KR); Joo Hyung Byeon, Seoul (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 15 days.

(21) Appl. No.: 18/789,079

(22) Filed: Jul. 30, 2024

(65) Prior Publication Data

US 2024/0388702 A1 Nov. 21, 2024

Related U.S. Application Data

(63) Continuation of application No. PCT/KR2023/000540, filed on Jan. 12, 2023.

(30) Foreign Application Priority Data

Feb. 22, 2022 (KR) ........................ 10-2022-0023183
Jan. 11, 2023 (KR) ........................ 10-2023-0003927

(51) Int. Cl.
*H04N 19/11* (2014.01)
*H04N 19/159* (2014.01)
(Continued)

(52) U.S. Cl.
CPC ........... *H04N 19/11* (2014.11); *H04N 19/159* (2014.11); *H04N 19/176* (2014.11); *H04N 19/196* (2014.11)

(58) Field of Classification Search
CPC .. H04N 19/196; H04N 19/463; H04N 19/132; H04N 19/105; H04N 19/11;
(Continued)

(56) References Cited

U.S. PATENT DOCUMENTS 11,805,248 B2 * 10/2023 Li ........................ H04N 19/176
12,120,335 B2 * 10/2024 Zhao .................... H04N 19/176
(Continued)

FOREIGN PATENT DOCUMENTS

KR 20220020325 A 2/2022
WO WO-2020141123 A1 * 7/2020 ........... H04N 19/593
WO 2021172881 A1 9/2021

OTHER PUBLICATIONS

Cao, Keming et al., Non-EE2: Fix for histogram of gradients derivation in DIMD mode, Joint Video Experts Team (JVET) of ITU-T SG 16 WP 3 and ISO/IEC JTC 1/SC 29 24th Meeting, by teleconference, JVET-X0156-v2. Oct. 12, 2021, 4pp.
(Continued)

*Primary Examiner* — Tsion B Owens
(74) *Attorney, Agent, or Firm* — Lempia Summerfield Katz LLC

(57) ABSTRACT

A method is disclosed for composing a MPM list in intra prediction. A video coding method and an apparatus derive intra-prediction modes for neighboring blocks that are non-usable for composing a Most Probable Mode list (MPM list) to organize the derived intra-prediction modes into an MPM list. The video coding method and the apparatus organize, based on history-based MPM list composition, the intra-prediction modes of non-adjacent blocks into a MPM list.

10 Claims, 24 Drawing Sheets

(51) Int. Cl.
*H04N 19/176* (2014.01)
*H04N 19/196* (2014.01)

(58) Field of Classification Search
CPC .... H04N 19/70; H04N 19/593; H04N 19/159; H04N 19/176
See application file for complete search history.

(56) References Cited

U.S. PATENT DOCUMENTS

| | | | | |
|---|---|---|---|---|
| 12,126,798 | B2 * | 10/2024 | Ko | H04N 19/11 |
| 2014/0133558 | A1 * | 5/2014 | Seregin | H04N 19/109<br>375/240.12 |
| 2019/0158846 | A1 | 5/2019 | Moon | |
| 2021/0211654 | A1 * | 7/2021 | Zhang | H04N 19/52 |
| 2021/0250579 | A1 * | 8/2021 | Zhu | H04N 19/46 |
| 2022/0038692 | A1 * | 2/2022 | Ko | H04N 19/11 |
| 2022/0086426 | A1 * | 3/2022 | Lee | H04N 19/132 |
| 2022/0360772 | A1 * | 11/2022 | Li | H04N 19/159 |
| 2023/0025763 | A1 * | 1/2023 | Wang | H04N 19/11 |
| 2023/0082043 | A1 | 3/2023 | Hendry | |
| 2024/0223755 | A1 * | 7/2024 | Lee | H04N 19/11 |
| 2025/0267262 | A1 * | 8/2025 | Deng | H04N 19/593 |

OTHER PUBLICATIONS

International Search Report and Written Opinion cited in corresponding international patent application No. PCT/KR2023/000540; May 2, 2023; 11 pp.

* cited by examiner

METHOD FOR CONSTRUCTING MPM LIST IN INTRA PREDICTION

CROSS-REFERENCE TO RELATED APPLICATIONS

This application is a continuation of International Application No. PCT/KR2023/000540 filed on Jan. 12, 2023, which claims priority to and the benefit of Korean Patent Application No. 10-2022-0023183, filed on Feb. 22, 2022, and Korean Patent Application No. 10-2023-0003927, filed on Jan. 11, 2023, the entire contents of each of which are incorporated herein by reference.

TECHNICAL FIELD

The present disclosure relates to a method of composing a most probable mode (MPM) list in intra prediction.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/Advanced Video Codec (AVC), High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required. In particular, for intra prediction, the most probable mode (MPM) list needs to be used efficiently to improve video coding efficiency and enhance video quality.

SUMMARY

The present disclosure provides a video coding method and an apparatus for composing a most probable mode list (MPM list) to improve video coding efficiency and enhancing video quality. The video coding method and the apparatus derive intra-prediction modes for neighboring blocks that are non-usable to organize the derived intra-prediction modes into a MPM list. In another embodiment, the video coding method and the apparatus organize, based on history-based MPM list composition, the intra-prediction modes of non-adjacent blocks into an MPM list.

At least one aspect of the present disclosure provides a method performed by a video decoding device for intra-predicting a current block. The method includes decoding from a bitstream a candidate index that indicates one of a plurality of candidate intra-prediction modes in a most probable mode list (MPM list). The method also includes composing the MPM list by using intra-prediction modes of neighboring blocks of the current block, a history-based MPM list (HMPM list), default modes, and neighbor prediction modes that are generated by applying an offset to directional modes among the intra-prediction modes of the neighboring blocks. The method also includes extracting an intra-prediction mode of the current block from the MPM list by using the candidate index. The method also includes generating a prediction block of the current block by using the intra-prediction mode of the current block. The method also includes updating the HMPM list by using the intra-prediction mode of the current block.

Another aspect of the present disclosure provides a method performed by a video encoding device for intra-predicting a current block. The method includes determining an intra-prediction mode of the current block. The method also includes composing a most probable mode list (MPM list) by using the intra-prediction modes of neighboring blocks of the current block, a history-based MPM list (HMPM list), default modes, and neighbor prediction modes that are generated by applying an offset to directional modes among the intra-prediction modes of the neighboring blocks. The method also includes generating a prediction block of the current block by using the intra-prediction mode of the current block. The method also includes and updating the HMPM list by using the intra-prediction mode of the current block. When the MPM list includes the intra-prediction mode of the current block, the method further includes determining, from the MPM list, a candidate index indicating the intra-prediction mode of the current block. The method further includes encoding the candidate index.

Yet another aspect of the present disclosure provides a computer-readable recording medium storing a bitstream generated by a video encoding method. The video encoding method includes determining an intra-prediction mode of a current block. The video encoding method also includes composing a most probable mode list (MPM list) by using the intra-prediction modes of neighboring blocks of the current block, a history-based MPM list (HMPM list), default modes, and neighbor prediction modes that are generated by applying an offset to directional modes among the intra-prediction modes of the neighboring blocks. The video encoding method also includes generating a prediction block of the current block by using the intra-prediction mode of the current block. The video encoding method also includes updating the HMPM list by using the intra-prediction mode of the current block. When the MPM list comprises the intra-prediction mode of the current block, the video encoding method further includes determining, from the MPM list, a candidate index indicating the intra-prediction mode of the current block. The video encoding method further includes encoding the candidate index.

As described above, the present disclosure provides a video coding method and an apparatus for deriving intra-prediction modes for neighboring blocks that are non-usable for composing a most probable mode list (MPM list) to organize the derived intra-prediction modes into an MPM list. In another embodiment, the video coding method and the apparatus organize, based on history-based MPM list composition, the intra-prediction modes of non-adjacent blocks into an MPM list. Thus, the video coding method and the apparatus improve video coding efficiency and enhance video quality.

DETAILED DESCRIPTION

Figure 1:
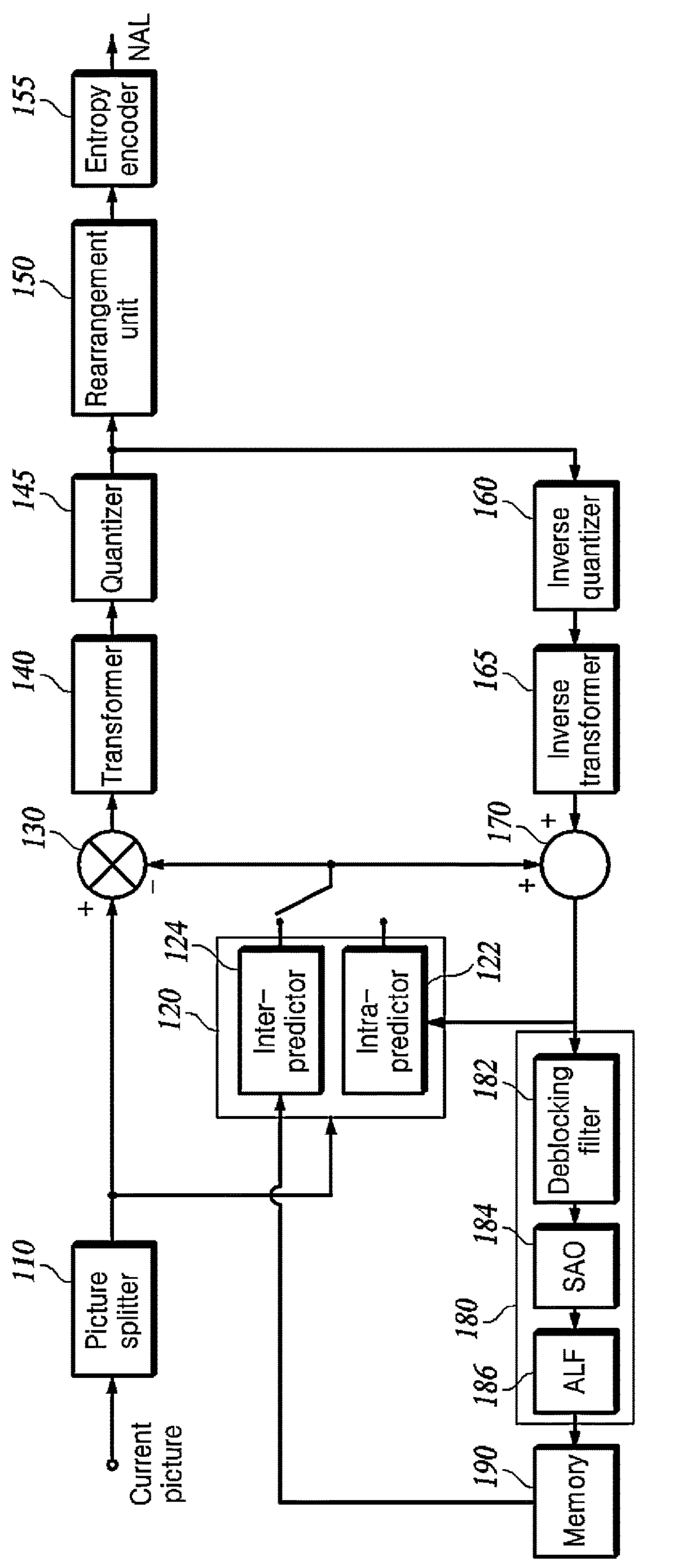
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUS included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
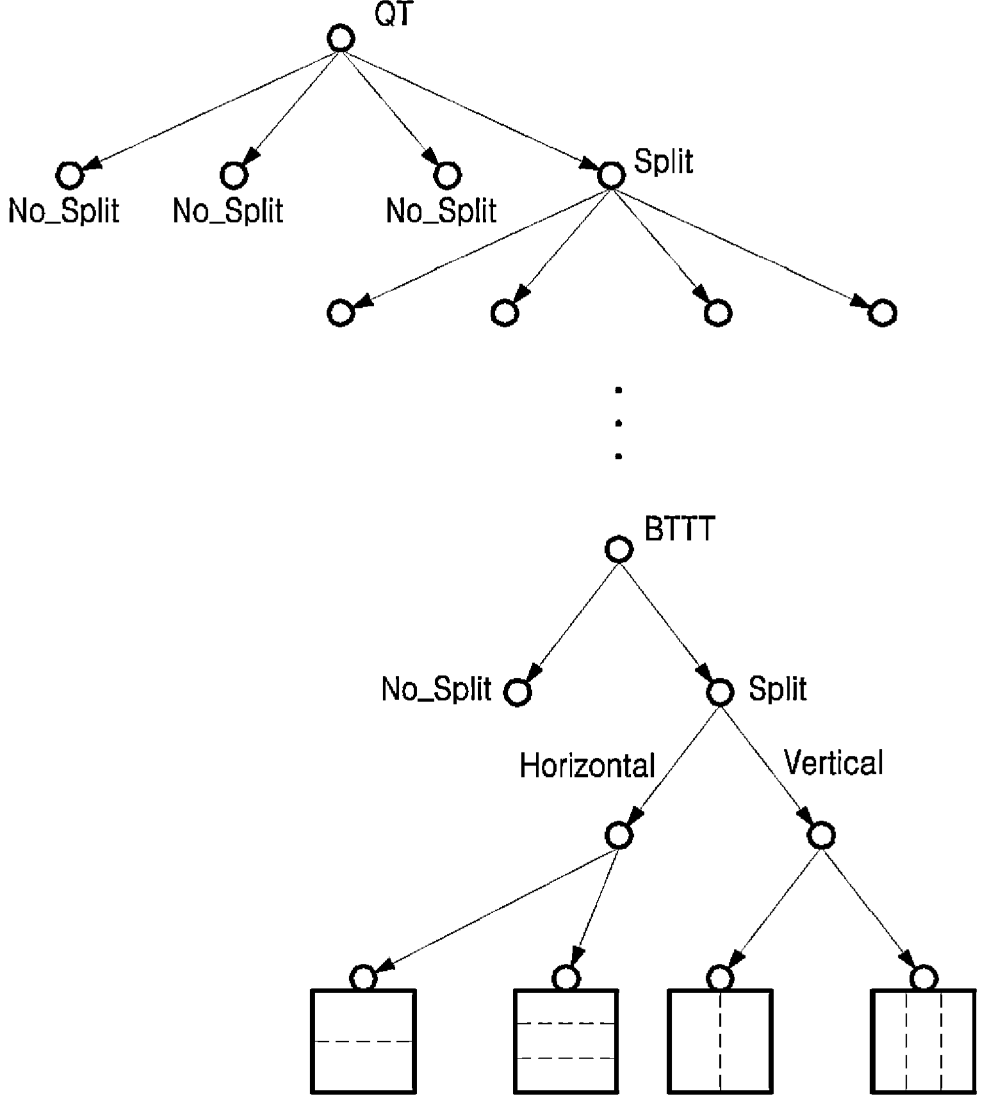
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
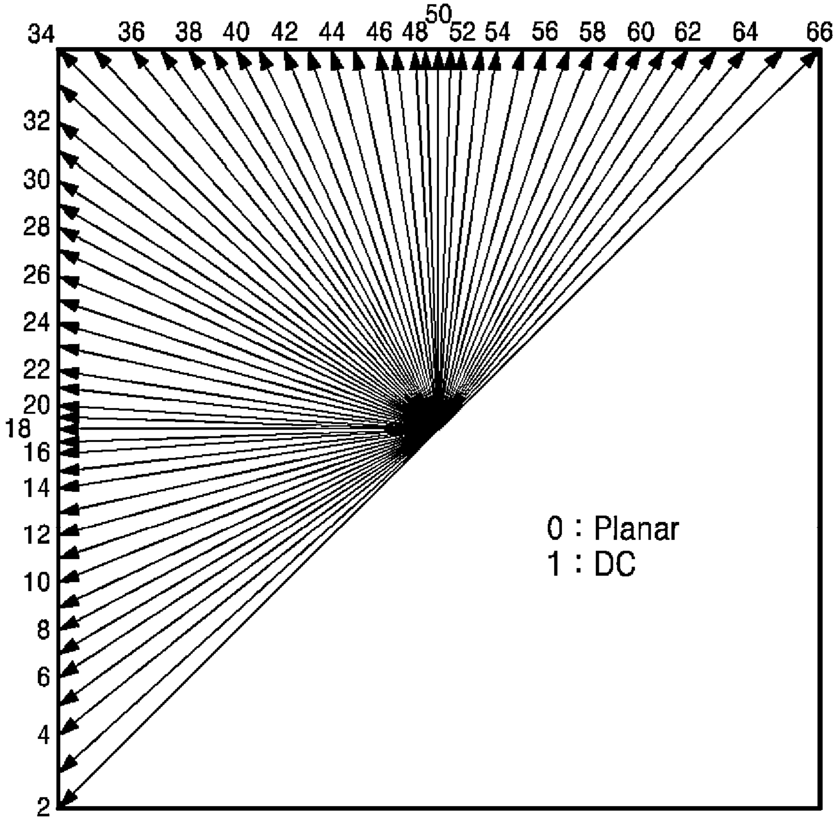
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
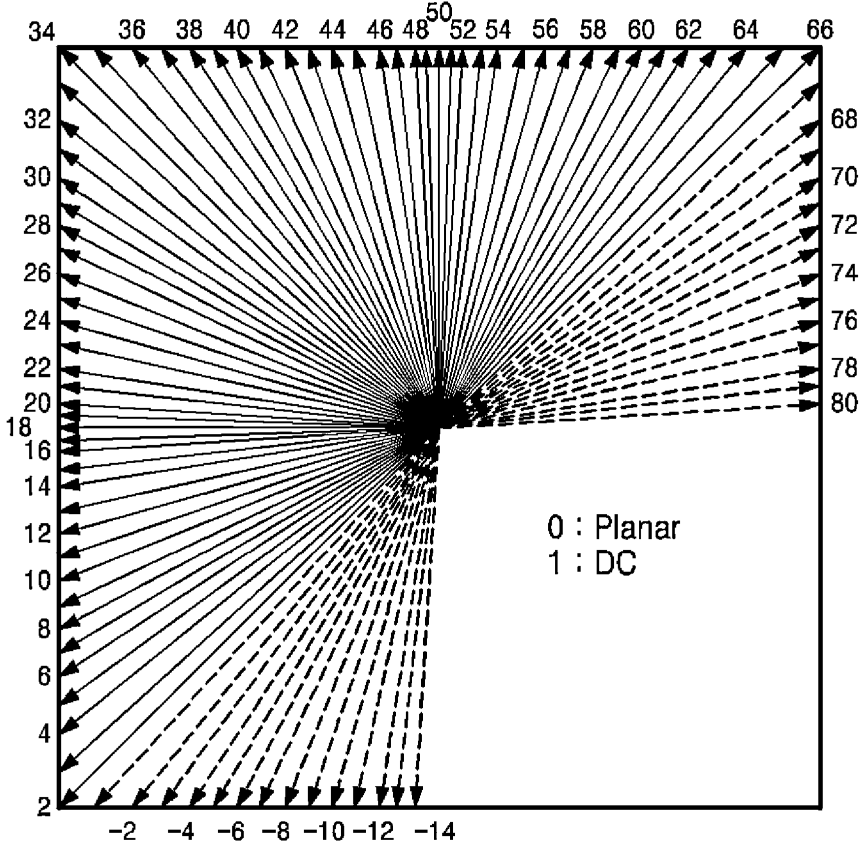

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
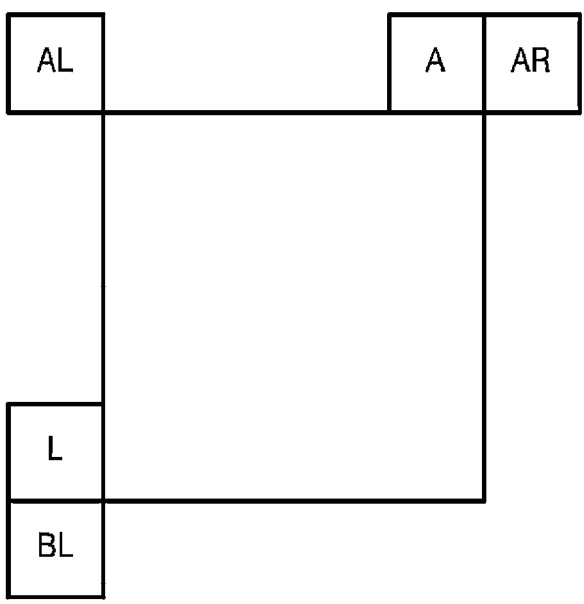
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
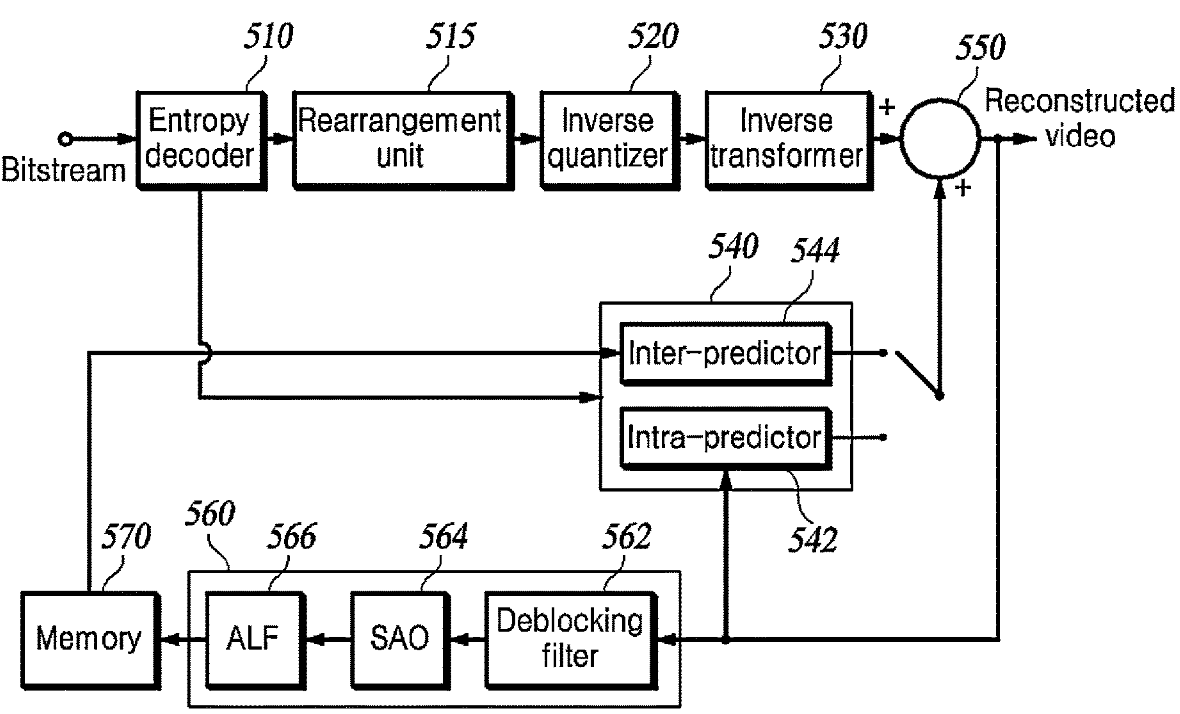
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of “0” as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus for deriving intra-prediction modes for neighboring blocks that are non-usable for Most Probable Mode (MPM) list composition and organizing the derived intra-prediction modes into an MPM list. In another embodiment, the video coding method and the apparatus organize the intra-prediction modes of non-adjacent blocks into an MPM list based on history-based MPM list composition.

The following embodiments may be performed by the intra predictor 122 in the video encoding device. The following embodiments may also be performed by the intra predictor 542 in the video decoding device.

The video encoding device in intra-prediction of the current block may generate signaling information associated with the present embodiments in terms of optimizing rate distortion. The video encoding device may use the entropy encoder 155 to encode the signaling information and may transmit the encoded signaling information to the video decoding device. The video decoding device may use the entropy decoder 510 to decode, from the bitstream, the signaling information associated with the intra prediction of the current block.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

I. MPM List

Figure 6:
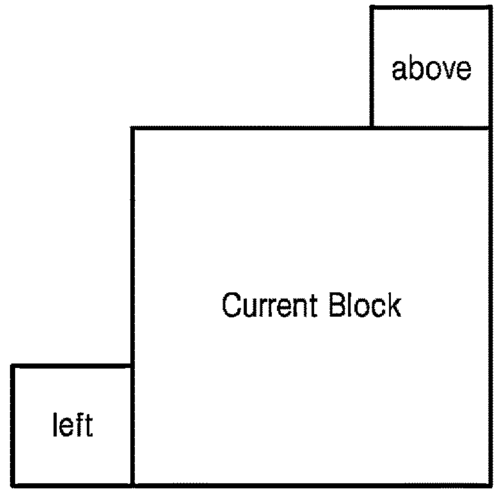
FIG. 6 is a diagram illustrating example neighboring blocks utilized in the composition of a most probable mode (MPM) list.

In Versatile Video Coding (VVC), as illustrated in FIG. 6, the video encoding device composes a 6-MPM list based on the intra-prediction modes of the blocks at the above and left positions relative to the current block. At this time, when the MPM list composition is incapable of using the intra-prediction mode of the above or left block, the video encoding device assigns the planar mode as the prediction mode of that block for use in the MPM list composition.

If the prediction modes of the above and left blocks are both nondirectional modes (DC or planar), the video encoding device composes a 6-MPM list of {Planar, DC, V, H, V−4, V+4}. Additionally, if the prediction mode of the above or left block is a directional mode, the video encoding device composes the MPM list by using the neighbor prediction modes of that directional mode. At this time, the MPM list may be composed so that the prediction modes do not overlap based on rules. The neighbor prediction modes represent prediction modes with an offset (e.g., ±1, ±2) applied relative to the corresponding directional mode.

When applying the MPM mode, the video encoding device may send the video decoding device a flag, MPM_flag, for indicating whether the MPM list is to be used. In addition, the video encoding device may transmit an MPM index, mpm_idx, in place of the index of the prediction mode, to improve the coding efficiency of the intra-prediction mode.

Figure 7:
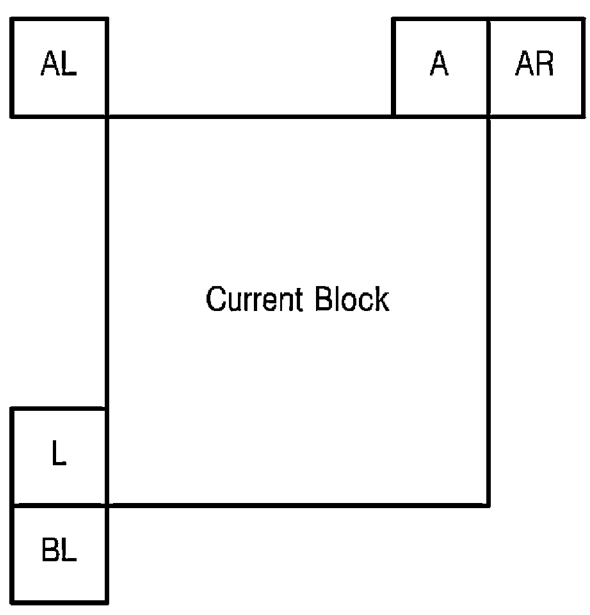
FIG. 7 is a diagram illustrating other example neighboring blocks utilized in the composition of an MPM list.

For the Enhanced Compression Model (ECM), the video encoding device composes an MPM list composed of 22 candidates based on intra-prediction modes of the neighboring blocks present at the L, A, BL, AR, and AL positions as illustrated in FIG. 7, neighbor prediction modes obtained with an offset (±1, ±2, . . . ) applied to the first two usable directional modes among the above intra-prediction modes and default modes. Here, the default modes include a horizontal mode (No. 18 in FIG. 3A), a vertical mode (No. 50 in FIG. 3A), and a diagonal mode in the top-left direction (No. 34 in FIG. 3A). The video encoding device organizes the planar and the first five prediction modes among the 22 candidates into a primary MPM (PMPM) list and organizes the remaining 16 prediction modes into a secondary MPM (SMPM) list. Meanwhile, the video decoding device parses a flag indicating whether the PMPM list is enabled or disabled, and if the flag is 1, the video decoding device parses the PMPM index to determine the current block's intra-prediction mode. On the other hand, if the PMPM flag is 0, the video decoding device may determine the current block's intra-prediction mode by parsing a flag indicating whether the SMPM list is enabled or disabled, and then may parse an SMPM index based on the value of the flag, or may parse an index of the remaining modes.

Hereinafter, an MPM index, a PMPM index, or an SMPM index is referred to as a candidate index. Thus, a candidate index indicates one prediction mode of the candidate intra-prediction modes included in the MPM list, PMPM list, or SMPM list.

The following embodiments may be performed in the video encoding device by the intra predictor 122 and the entropy encoder 155. Further, the following embodiments may be performed in the video decoding device by the entropy decoder 510 and the intra predictor 542. The following embodiments are described about the video encoding device but may be equally applicable to the video decoding device.

II. Composition of the MPM List According to Embodiments

Figure 8:
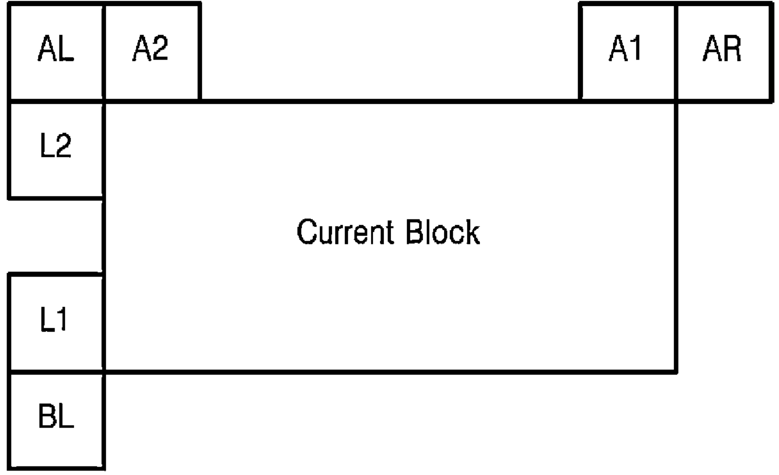
FIG. 8 is a diagram illustrating the locations of neighboring blocks of the current block.

FIG. 8 is a diagram illustrating the locations of neighboring blocks of the current block.

The video encoding device may compose the MPM list in various ways, based on the embodiment. For example, the MPM list may be composed based on intra-prediction modes of all or some of the locations illustrated in FIG. 8, e.g., {L1, A1}, {L1, A1, AL}, {L1, A1, BL, AR, AL}, or {L1, A1, BL, AR, L2, A2, AL}. The video encoding device may compose the MPM list by using all or some of the intra-prediction modes of the neighboring blocks, the neighbor prediction modes of directional modes if included the intra-prediction modes of the neighboring blocks, the HMPM list, the intra-prediction modes derived based on previously reconstructed neighboring reference samples, or the default modes.

In one example, the MPM list may include as many as $N_{MPM}$ prediction modes which may be composed into the list based on the intra-prediction modes of neighboring blocks, the HMPM list, and the default modes. If a secondary MPM list is used, the prediction modes as many as $N_{PMPM}$ of the total $N_{MPM}$ prediction modes may be used into the primary MPM list and those as many as $N_{SMPM}$ may be used into the secondary MPM list. In this case, $N_{MPM}$ is the sum of $N_{PMPM}$ and $N_{SMPM}$.

The following describes a method of deriving an HMPM list and a method of deriving intra-prediction modes based on previously reconstructed neighboring reference samples.

<Embodiment 1> MPM List Composition by Using History-Based MPM List (HMPM List)

In this embodiment, to compose an MPM list for efficiently encoding intra-prediction modes, the video encoding device organizes the prediction modes of previously reconstructed blocks into an HMPM list and then organizes some of the modes in the HMPM list into an MPM list. For example, the video encoding device may compose the MPM list based on the intra-prediction modes of blocks other than the neighboring blocks immediately adjacent to the current block.

The video encoding device may compose the intra-prediction modes of the reconstructed blocks into an HMPM list following a rule-based first-in-first-out (FIFO) structure in a reconstruction order. The video encoding device may compose the HMPM list by keeping the most recently added mode in the list and removing the oldest added mode.

Figure 9:
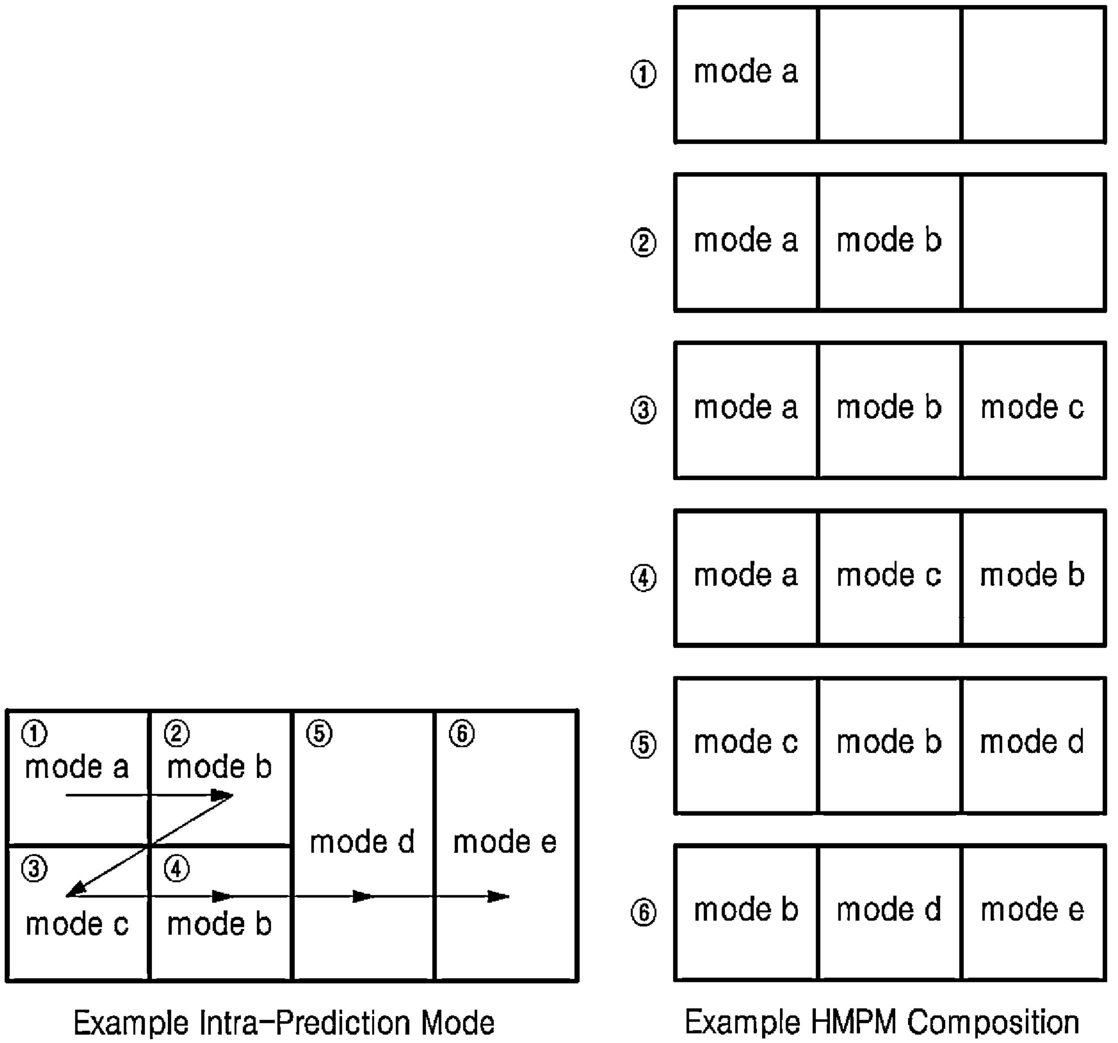
FIG. 9 is a diagram illustrating a composition of the history-based MPM (HMPM) list according to at least one embodiment of the present disclosure.

FIG. 9 is a diagram illustrating a composition of the HMPM list according to at least one embodiment of the present disclosure.

In one embodiment, the video encoding device adds a new prediction mode to the end of the HMPM list in a reconstruction order. When the new prediction mode is added, if the size of the HMPM list does not exceed the maximum size ($N_{HMPM}$), the HMPM list may be updated as follows, based on whether the prediction mode is a duplicate in the list. If the prediction mode to be added does not exist in the HMPM list, the video encoding device inserts the new prediction mode at the end of the current HMPM list (①, ② in FIG. 9). If the prediction mode to be added exists in the HMPM list, the video encoding device deletes the duplicate prediction mode, moves the stored prediction modes forward one by one from that position to the most recent position, and inserts the new prediction mode at the end of the HMPM list after movement.

On the other hand, if the size of the HMPM list exceeds the maximum size ($N_{HMPM}$) when adding a new prediction mode, the HMPM list may be updated as follows, depending on whether the prediction mode exists or not in the list as a duplicate. If the prediction mode to be added does not exist in the HMPM list, the video encoding device removes the earliest prediction mode in the list, moves the remaining prediction modes forward one by one, and inserts the new prediction mode at the end of the HMPM list (④, ⑤ in FIG. 9). If the prediction mode to be added already exists in the HMPM list, the video encoding device removes the duplicate prediction mode, moves the stored prediction modes forward one by one from that position to the last position, and inserts the new prediction mode at the end of the HMPM list (③, ④ in FIG. 9).

In the example of FIG. 9, the blocks are encoded or decoded according to the z-scan order, and the size ($N_{HMPM}$) of the HMPM list is 3.

When the size of the MPM list is $N_{MPM}$, the video encoding device can generate n prediction modes ($n \le N_{MPM}$) out of the NMPMs from the HMPM list. The n prediction modes may be added to the MPM list in order starting from the last added prediction mode in the HMPM list. In this case, if a prediction mode in the HMPM list already exists in the MPM list, that mode is excluded and the next prediction mode may be added to the MPM list.

As an example, the video encoding device may compose the MPM list as follows. The video encoding device may insert into the MPM list the intra-prediction modes of a preset number of neighboring blocks and a preset number of neighbor prediction modes. The neighbor prediction modes may be generated by applying an offset (±1, ±2, . . . ) to the directional modes among the intra-prediction modes of the preset number of neighboring blocks. The video encoding device may perform a redundancy check before adding each intra-prediction mode to the MPM list. If the number of filled candidates is less than $N_{MPM}$, the video encoding device adds the prediction modes from the HMPM list to the MPM list until the number of candidates is equal to $N_{MPM}$. At this time, a redundancy check may be performed. If the addition of the prediction modes from the HMPM list doesn't bring the number of MPM list candidates to $N_{MPM}$, the video encoding device may fill in the MPM list with the default modes, taking into account redundancy. In some embodiments, a particular mode, e.g., planar mode may always be added to the top priority position of the MPM list. Alternatively, the order in which the particular mode is added to the MPM list may be varied.

As another example, when the MPM list is composed, upon detecting a neighboring block incapable of using the intra-prediction mode among the neighboring blocks, the video encoding device may assign an intra-prediction mode for that neighboring block by using the HMPM list. For example, the most recently added prediction mode in the HMPM list may be assigned as the intra-prediction mode for that neighboring block. The video encoding device may then generate the MPM list according to the composition rules. The case of an intra-prediction mode being non-usable indicates that the relevant block is encoded with inter prediction or is not encoded with such an intra-prediction mode as DC, planar, directional mode, and the like. illustrated in FIG. 3A, e.g., Matrix weighted Intra Prediction mode (MIP mode). Additionally, cases where intra-prediction mode is non-usable may indicate that the current block exists on a picture or slice boundary, and/or that the top boundary of the current block coincides with the top boundary of the current CTU.

When the MPM list is used, the video decoding device may determine the intra-prediction mode of the current block and may update the HMPM list, as follows.

The video decoding device composes the MPM list based on the HMPM list and then parses the MPM_flag. If MPM_flag is true, the video decoding device parses and uses mpm_index to determine the intra-prediction mode of the current block from the MPM list. If MPM_flag is 0, the video decoding device determines the intra-prediction mode of the current block by parsing one of the remaining prediction modes except those included in the MPM list. The video decoding device then uses the determined intra-prediction mode of the current block to update the HMPM list according to the HMPM composition rules as described above.

Alternatively, if the video decoding device utilizes a secondary MPM list, the video decoding device may determine the intra-prediction mode of the current block and may update the HMPM list as follows.

The video decoding device composes the MPM list based on the HMPM list and then parses the PMPM_flag to determine whether to use the PMPM list. If PMPM_flag is 1, the video decoding device parses and uses the PMPM index to determine the intra-prediction mode of the current block from the PMPM list. If PMPM flag is 0, the video decoding device parses SMPM_flag to determine whether to apply a secondary MPM list. If SMPM_flag is 1, the video decoding device parses and uses the SMPM index to determine the intra-prediction mode of the current block from the SMPM list. If SMPM_flag is 0, the video decoding device determines the intra-prediction mode of the current block by parsing one of the remaining prediction modes except the prediction modes included in the SMPM list and the PMPM list. Then, the video decoding device uses the determined intra-prediction mode of the current block to update the HMPM list according to the HMPM composition rules as described above.

In one example, the video encoding device may initialize the HMPM list in units of CTU rows. The video encoding device may determine a flag indicating whether to use the HMPM list per picture basis or per sequence basis and then may determine whether to organize the HMPM list based on the determined flag. Further, the video encoding device may apply the HMPM list for I-pictures or I-slices for which only intra prediction is performed.

Further, with an intra-prediction mode that is supposed to be added to the HMPM list (e.g., planar mode), the video encoding device may omit updating the HMPM list not to add that prediction mode to the HMPM list.

<Embodiment 2> MPM List Composition by Using Derived Intra-Prediction Modes

In this embodiment, if a neighboring block's intra-prediction mode is non-usable, i.e., the intra-prediction mode is not a regular intra-prediction mode such as DC, planar, directional mode, and the like, the video encoding device may derive an intra-prediction mode for the relevant location and may use the derived intra-prediction mode to compose the MPM list.

In one example, the video encoding device may store intra-prediction modes and may use the stored intra-prediction modes to derive intra-prediction modes of neighboring blocks encoded according to the inter prediction.

Figure 10:
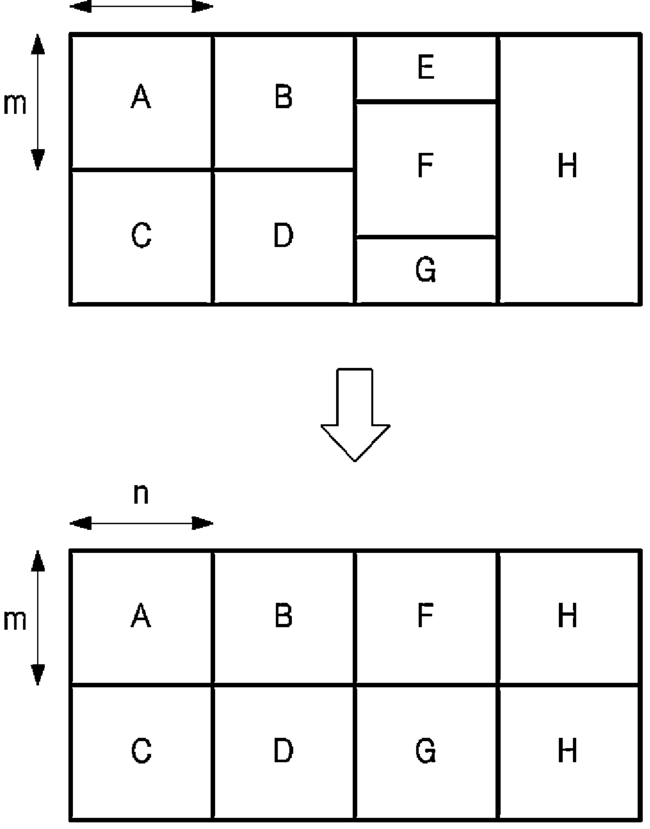
FIG. 10 is a diagram illustrating the storage of an intra-prediction mode, according to at least one embodiment of the present disclosure.

First, the video encoding device may store intra-prediction modes in n×m units in a prediction-mode storage. After encoding the current block, the video encoding device may store the intra-prediction mode of the current block in n×m units. If multiple blocks are in the n×m region that is the prediction-mode saving unit, stored may be the intra-prediction mode of the block at a specific position of the n×m block or the intra-prediction mode of the block with the largest overlapping area with the n×m block. In this case, the specific location may be predefined according to an agreement between the video encoding device and the video decoding device. For example, the specific location may be the n×m block's top-left corner (0,0), center (n/2, m/2), or lower-right corner (n−1, m−1). In the example of FIG. 10, for blocks encoded with intra-prediction modes A through H, the prediction mode of the bottom-right (n−1, m−1) block is stored in n×m units in the prediction-mode storage.

Alternatively, if the number of directional modes in the entire picture is $N_{ang}$, the video encoding device may map the directional modes into $M_{ang}$ ($<N_{ang}$) prediction modes and may store the mapped prediction modes. At this time, the mapping relationship may be predefined according to a commitment between the video encoding device and the video decoding device. When the intra-prediction modes are stored, the video encoding device may map the relevant directional modes to the closest one of the $M_{ang}$ modes and store the mapped directional modes as modes 2 through $M_{ang}+1$. For example, the planar mode is stored as mode 0, the DC mode as mode 1, and the mapped directional modes as modes 2 through $M_{ang}+1$. When the stored intra-prediction modes are used, if the stored intra-prediction modes are modes 2 through $M_{ang}+1$, the video encoding device may reverse map the modes back to the $M_{ang}$ directional modes and may use the reverse-mapped prediction modes. In this case, for the directional mode mapping and inverse mapping, the video encoding device may utilize a look-up table (LUT).

Based on the directional mode mapping, the video encoding device may store intra-prediction modes with the planar and DC modes included for the n×m block. In this case, a fixed bit of size 'floor ($\log2(M_{ang}+2)$)+1' may be utilized to index the intra-prediction modes of neighboring blocks.

In one aspect, the video encoding device may derive an intra-prediction mode for the inter-predicted block to store the intra-prediction mode. The video encoding device may derive a specific mode (e.g., planar, DC, etc.) as the intra-prediction mode for the inter-predicted block. The derivation process may omit to utilize the prediction-mode storage.

Figure 11:
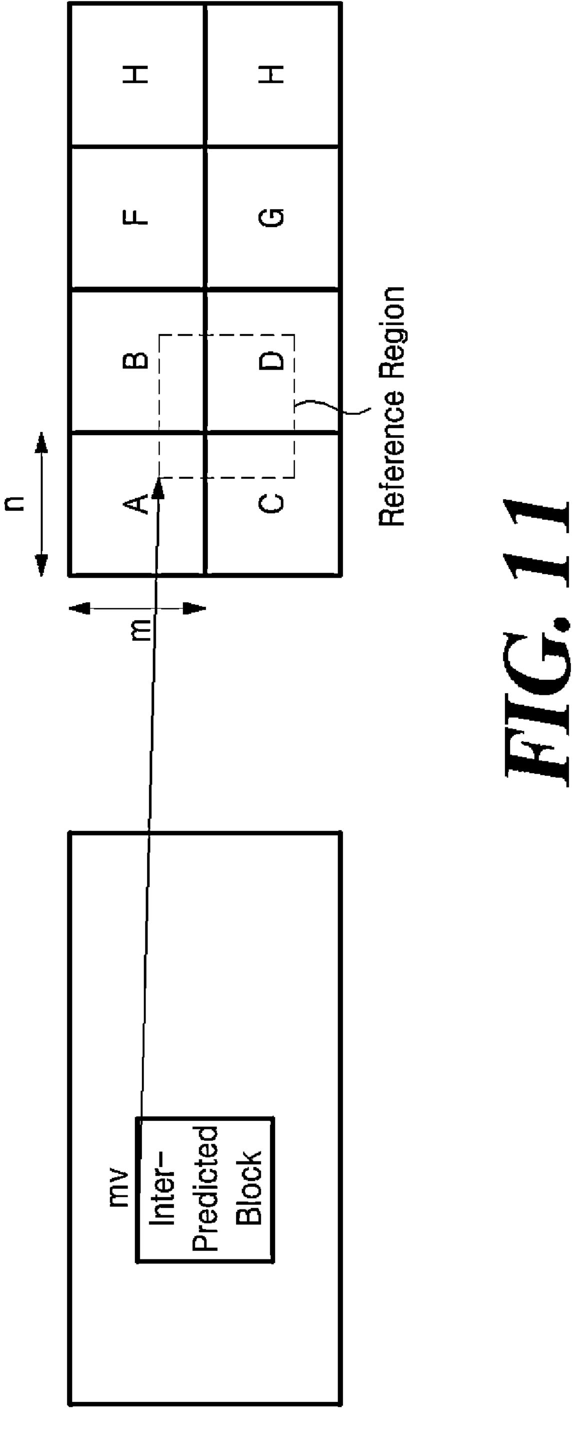
FIG. 11 is a diagram illustrating the derivation of an intra-prediction mode corresponsive to an inter-predicted block, according to at least one embodiment of the present disclosure.

FIG. 11 is a diagram illustrating the derivation of an intra-prediction mode corresponsive to an inter-predicted block, according to at least one embodiment of the present disclosure.

Alternatively, the video encoding device may derive an intra-prediction mode for a reference region indicated by a motion vector (mv) of an inter-predicted block in a reference picture, by using such a pre-stored intra-prediction mode. As illustrated in FIG. 11, if multiple intra-prediction modes exist in the reference region selected according to the motion vector, the video encoding device may derive the intra-prediction mode at a specific location to be the intra-prediction mode of the inter-predicted block. Alternatively, the video encoding device may derive the intra-prediction mode of the region in the reference picture having the largest area overlapping with the reference region to be the intra-prediction mode of the inter-predicted block. Here, the specific location may be defined in advance based on an agreement between the video encoding device and the video decoding device.

Meanwhile, the video encoding device may, after deriving the intra-prediction mode from the reference picture by using the motion vector for the inter-predicted neighboring block as described above, compose the MPM list by using the derived prediction mode. For example, when an intra-prediction mode of an inter-predicted block is derived from the prediction-mode storage, the video encoding device may derive the stored intra-prediction mode of the reference picture to be the intra-prediction mode of the block by using the motion vector of the block. In this case, if there are multiple intra-prediction modes in the reference region in the reference picture, the video encoding device may derive the intra-prediction mode at a specific location to the intra-prediction mode of the corresponding block or may derive the intra-prediction mode of the region with the largest overlapping area with the reference region in the reference picture to the intra-prediction mode of the corresponding block.

As another example, the video encoding device may derive the intra-prediction mode based on the neighboring reference samples if the intra-prediction mode of the neighboring blocks is non-usable.

First, the video encoding device determines whether the intra-prediction mode of the neighboring blocks is usable or non-usable. If the intra-prediction mode of the neighboring blocks is non-usable, the video encoding device may derive the intra-prediction mode based on the neighboring reference samples and may then use the derived prediction mode to compose the MPM list.

Figure 12:
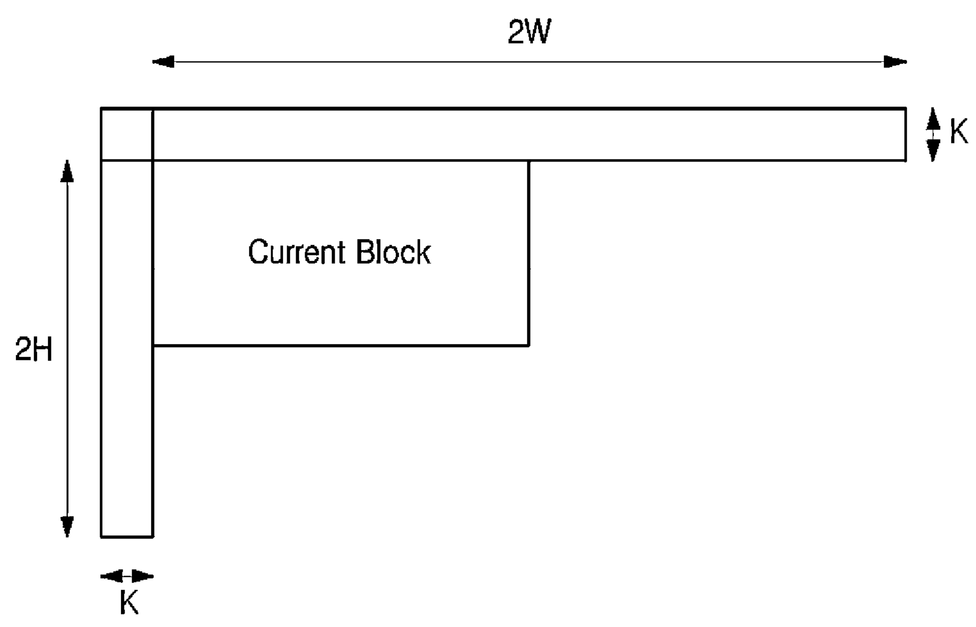
FIG. 12 is a diagram illustrating reference samples used for the derivation of an intra-prediction mode, according to at least one embodiment of the present disclosure.

FIG. 12 is a diagram illustrating reference samples used for the derivation of an intra-prediction mode, according to at least one embodiment of the present disclosure.

The video encoding device may use previously reconstructed neighboring reference samples of the current block to derive the intra-prediction mode. As illustrated in FIG. 12, the previously reconstructed neighboring reference samples relative to the current block are present in the top and left regions by the size of K pixels. In the example of FIG. 12, W and H denote the width and height of the current block.

Figure 13A:
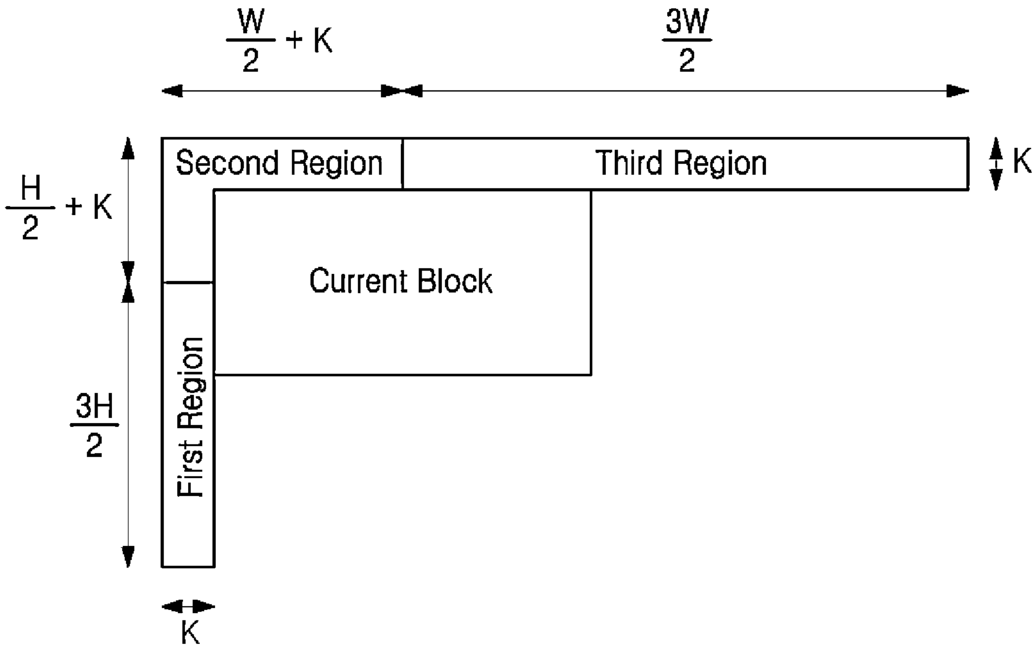
FIGS. 13A, 13B, and 13C are diagrams illustrating regions used for the derivation of an intra-prediction mode, according to at least one embodiment of the present disclosure.
Figure 13B:
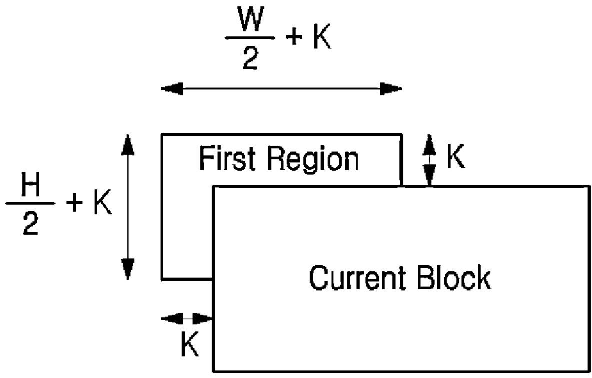
Figure 13B:
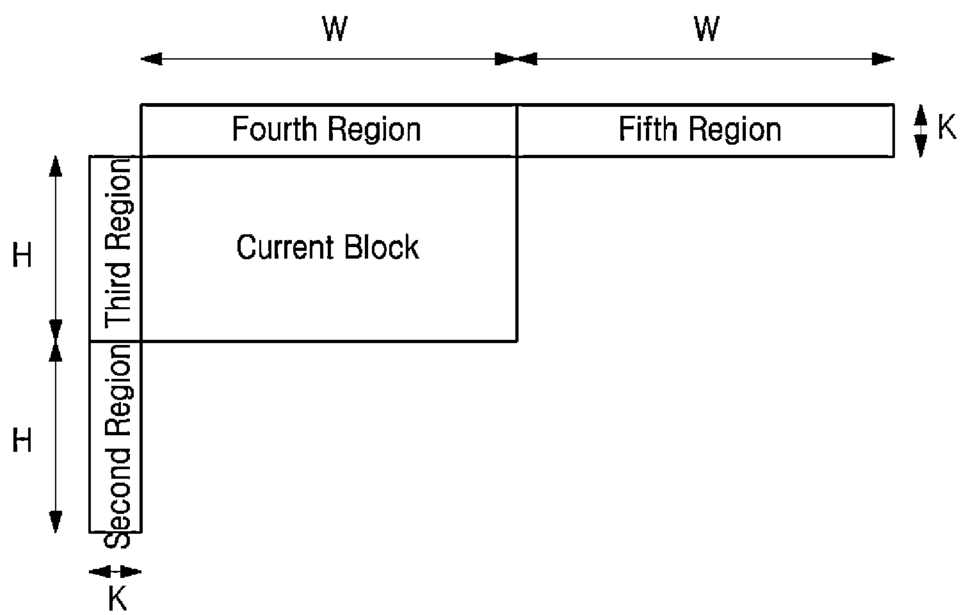
Figure 13C:
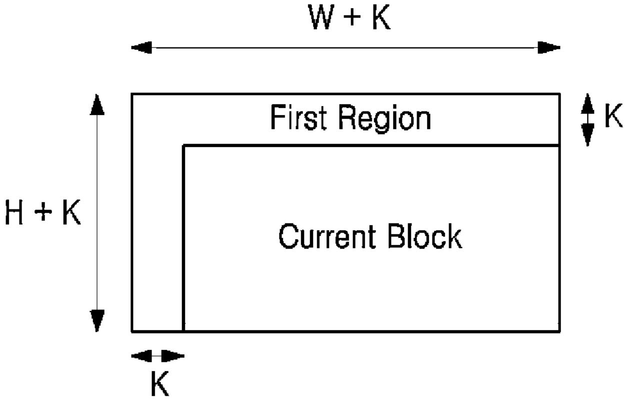
Figure 13C:
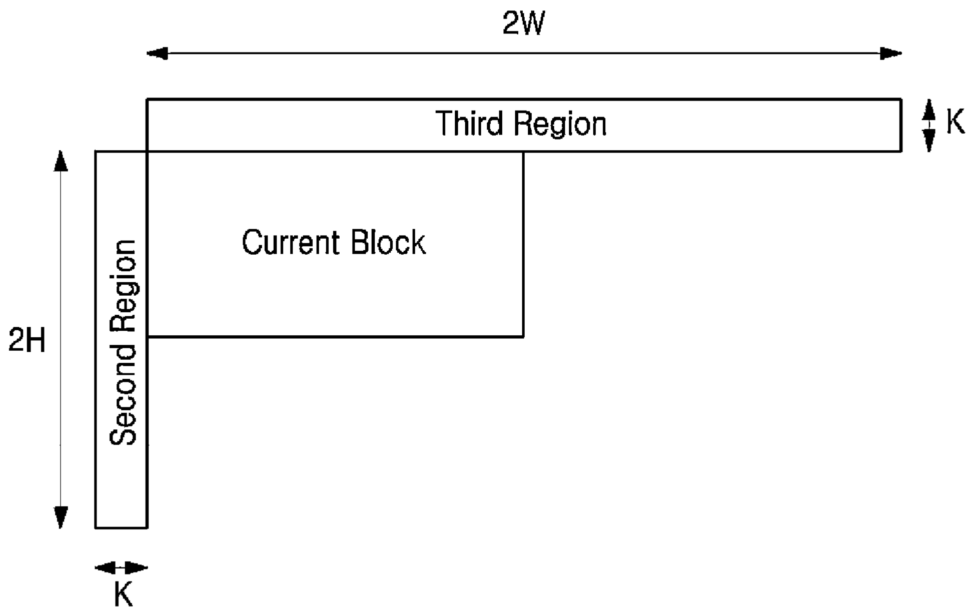

Meanwhile, the video encoding device may partition the reference samples illustrated in FIG. 12 into a plurality of regions and then may utilize the reference samples in each region to derive a region-specific intra-prediction mode. As illustrated in FIGS. 13A, 13B, and 13C, a plurality of regions of various shapes may be utilized. The multiple regions may be isolated from each other, as in the example of FIG. 13A or the multiple regions may overlap, as in the example of FIG. 13B or FIG. 13C.

In accordance with embodiments, the video encoding device may use regions within a block incapable of using intra-prediction modes, or reconstructed neighboring samples of the block, to derive intra-prediction mode for the block.

Figure 14:
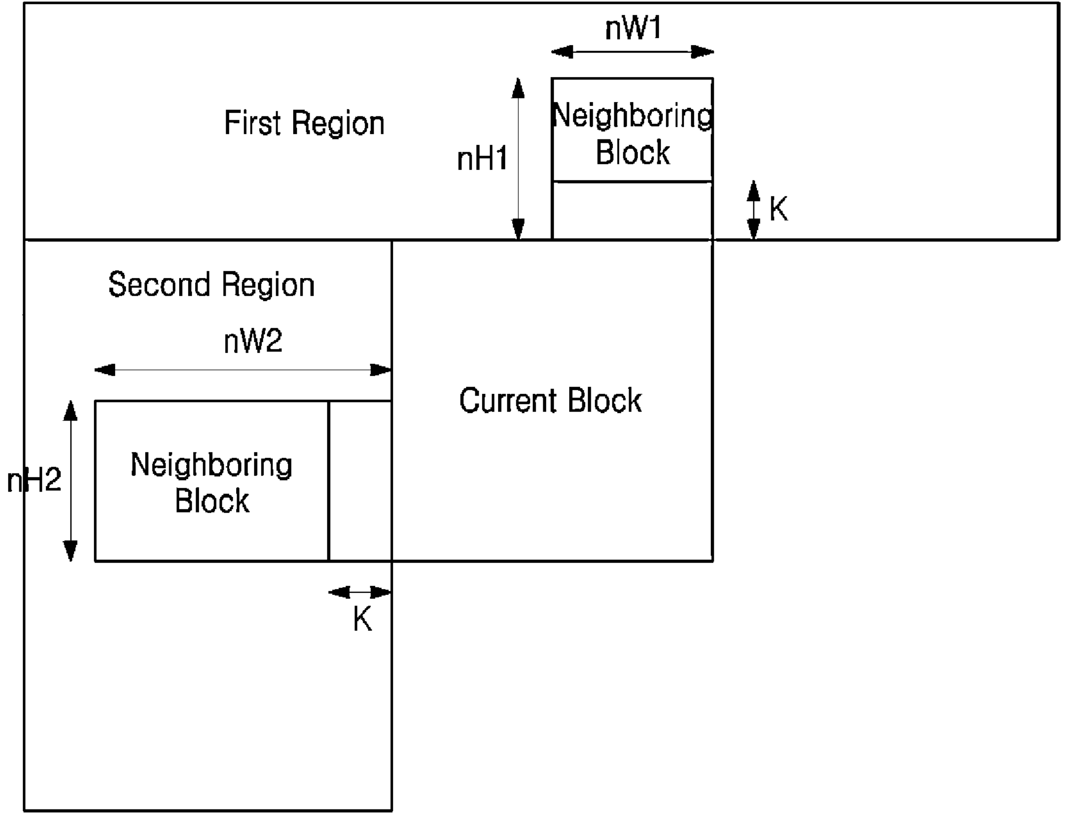
FIG. 14 is a diagram illustrating the derivation of an intra-prediction mode, according to at least one embodiment of the present disclosure.
Figure 15:
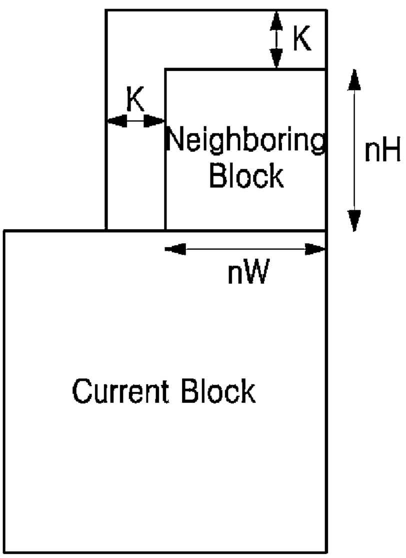
FIG. 15 is a diagram illustrating the derivation of an intra-prediction mode, according to another embodiment of the present disclosure.

In the example of FIG. 14, the video encoding device uses a region of a block incapable of using intra-prediction modes to derive the prediction mode for that block. For example, the video encoding device may derive the intra-prediction mode in relation to a block located in the top first region of the current block by using reference samples of K-pixel size at the bottom of the same block and may derive the intra-prediction mode in relation to a block located in a second region by using reference samples of K-pixel size at the right of the same block. In the example of FIG. 15, the video encoding device derives the intra-prediction mode for a block by using reference samples neighboring the block incapable of using intra-prediction modes. For example, the video encoding device may derive the intra-prediction modes by using reference samples to the left and top of the block. In the examples of FIGS. 14 and 15, nW, nW1, or nW2 denotes the width of the neighboring block, and nH, nH1, or nH2 denotes the height of the neighboring block.

Figure 16:
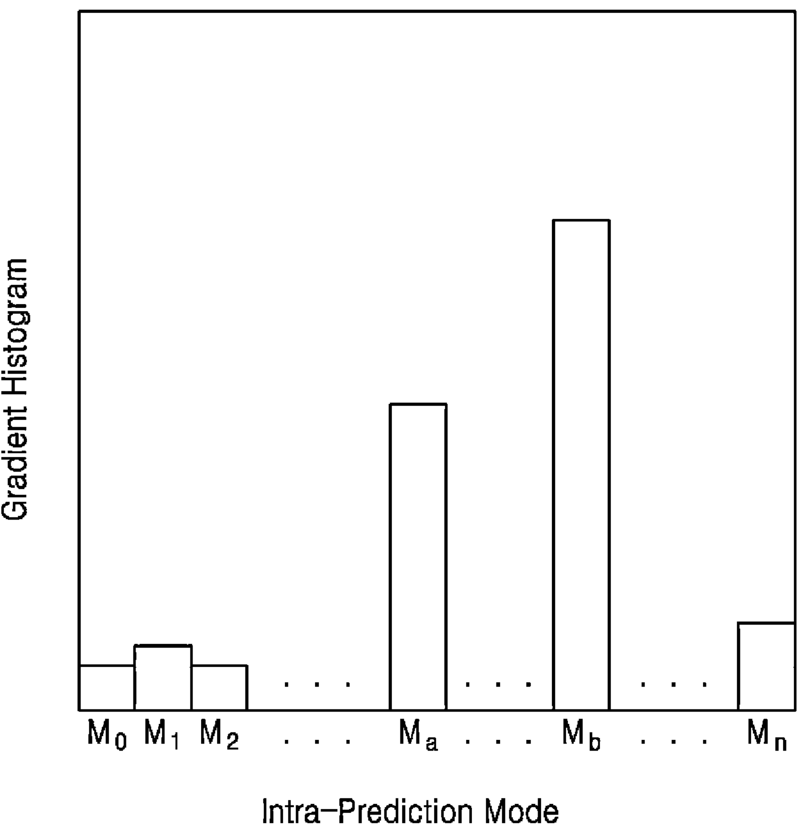
FIG. 16 is a diagram illustrating a gradient histogram according to an intra-prediction mode.

The video encoding device may derive the intra-prediction mode by calculating a dominant directionality based on previously reconstructed reference samples. For example, for each region, the video encoding device may calculate a direction (θ) and a magnitude (I) about the previously reconstructed pixels within the region. For each pixel, the video encoding device may map the calculated direction to the most similar intra directional mode and may accumulate the magnitudes of the directional modes to compose a gradient histogram for the pixels within the region, as shown in the example of FIG. 16. In the example of FIG. 16, $M_0$ through $M_n$ represent the directional modes. The video encoding device may then derive the directional mode with the largest gradient histogram value ($M_b$ in the example of FIG. 16) as the intra-prediction mode of the region. At this time, for each pixel in the region, the direction and magnitude may be calculated according to Equation 1.

$$\partial = \arctan\left(\frac{Gv}{Gh}\right)$$
$$I = \sqrt{Gv^2 + Gh^2}$$
[Equation 1]

Here, Gh and Gv, representing the gradient values in the horizontal and vertical directions, may be calculated by using a two-dimensional filter or a one-dimensional filter as shown in Table 1.

TABLE 1

| | Horizontal filter | Vertical filter |
|---|---|---|
| Filter Embodiment 1 | −1 0 1<br>−2 0 2<br>−1 0 1 | −1 −2 −1<br>0 0 0<br>1 2 1 |
| Filter Embodiment 2 | −1 0 1<br>−1 0 1<br>−1 0 1 | −1 −1 −1<br>0 0 0<br>1 1 1 |
| Filter Embodiment 3 | −1 0 1 | −1 0 1 |

Further, upon detecting a neighboring block incapable of using the intra-prediction modes among the neighboring blocks at a location prearranged between the video encoding device and the video decoding device, the video encoding device may generate a gradient histogram in relation to the previously reconstructed samples in the same neighboring block and may derive the intra-prediction mode with the largest histogram value to be the intra-prediction mode for the block. The video encoding device may compose an MPM list based on the derived intra-prediction mode. In this case, if the largest histogram value is less than a preset threshold value, the intra-prediction mode may be derived with a non-directional mode (DC or planar mode). The threshold value may be determined based on the size of the block related to the computation of the gradient histogram.

Alternatively, the video encoding device may generate the gradient histogram for the entire region without partitioning the reference sample region illustrated in FIG. 12. Upon detecting a neighboring block incapable of using intra-prediction modes among neighboring blocks used for the MPM list composition, the video encoding device may generate the gradient histogram and may derive the prediction mode having the largest histogram value to be the intra-prediction mode of the same neighboring block. In this case, if two or more neighboring blocks are incapable of using intra-prediction modes, the video encoding device may derive the intra-prediction modes of the neighboring blocks orderly beginning with the mode having the largest histogram value. The video encoding device may then compose the MPM list based on the derived prediction modes.

As another embodiment, upon detecting a neighboring block incapable of using intra-prediction modes because the neighboring block is encoded in inter-prediction mode, the video encoding device may derive the intra-prediction modes by using a neighboring reference sample in the reference region in the reference picture indicated by the motion vector of the same neighboring block.

The video encoding device may be responsive, when the neighboring block considered for composing the MPM list is encoded in inter-prediction mode, for deriving intra-prediction modes as follows.

First, the video encoding device checks whether a neighboring block is capable or incapable of using intra-prediction modes. If the neighboring block is encoded by using inter prediction signifying the incapability, the video encoding device uses the motion vector (mv) of the same neighboring block to derive the position of the reference region of the current block in the reference picture. The video encoding device may derive the intra-prediction modes based on reference samples in the reference region and then may use the derived prediction modes to compose the MPM list.

Figure 17:
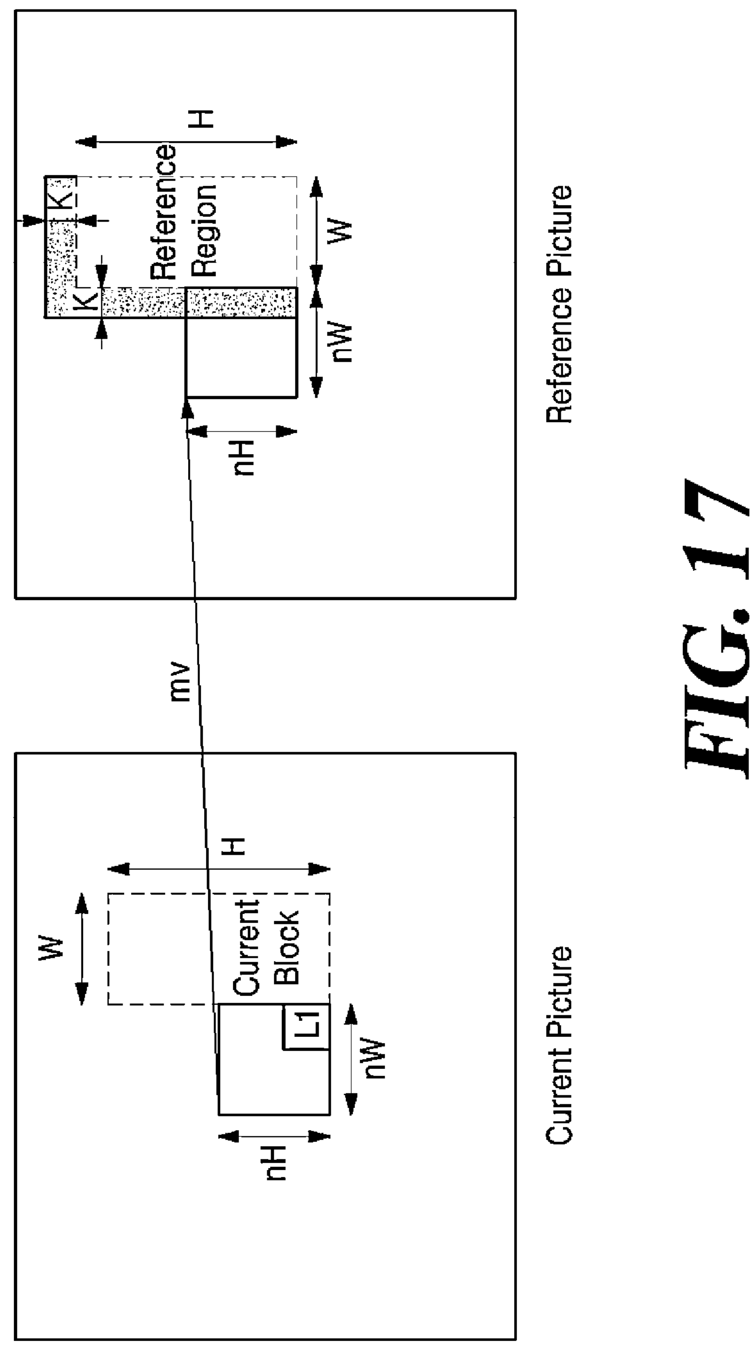
FIG. 17 is a diagram illustrating the derivation of an intra-prediction mode for an inter-predicted block, according to at least one embodiment of the present disclosure.
Figure 18:
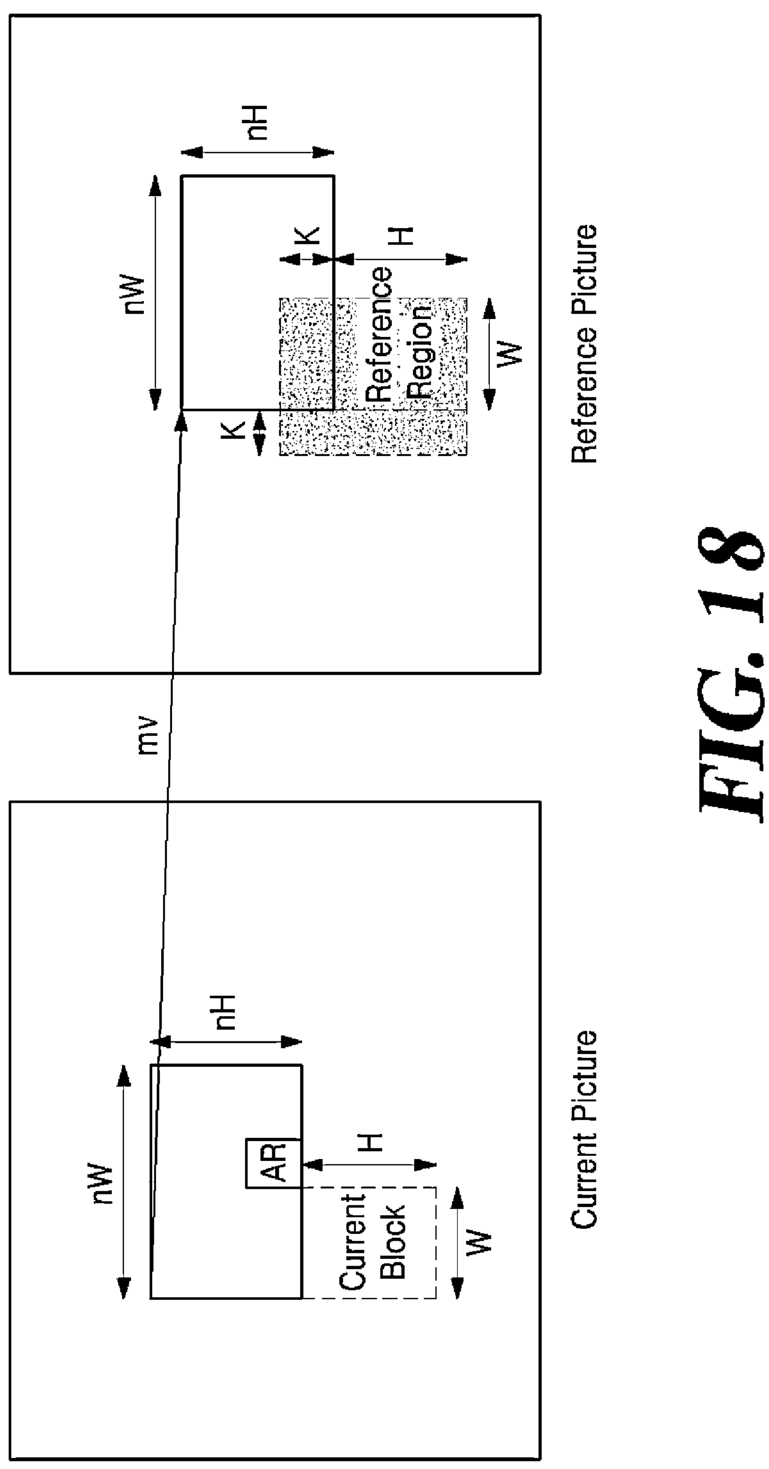
FIG. 18 is a diagram illustrating the derivation of an intra-prediction mode for an inter-predicted block, according to another embodiment of the present disclosure.

For example, the reference samples in the reference region may be utilized as follows. First, the video encoding device may derive the location of the reference region of the current block in the reference picture by using the motion vector (mv) of the relevant neighboring block. The video encoding device may generate a gradient histogram based on the k-pixel-sized neighboring reference samples of the reference region illustrated in FIG. 17. Alternatively, the video encoding device may generate a gradient histogram based on the k-pixel-sized neighboring reference samples of the reference region illustrated in FIG. 18, and reference samples within the reference region. Then, the video encoding device may derive the directional mode with the largest histogram value in the generated gradient histogram to be the intra-prediction mode. At this time, if the largest histogram value in the gradient histogram is smaller than a preset threshold value, the intra-prediction mode may be derived with a non-directional mode (DC or planar mode). The threshold value may be determined based on the size of the block related to the computation of the gradient histogram.

If a neighboring block is inter-predicted by using bidirectional prediction, the video encoding device may derive the intra-prediction mode by using a preset reference picture (L0 or L1 picture). In this case, the preset reference picture may be predefined according to an agreement between the video encoding device and the video decoding device.

Figure 19:
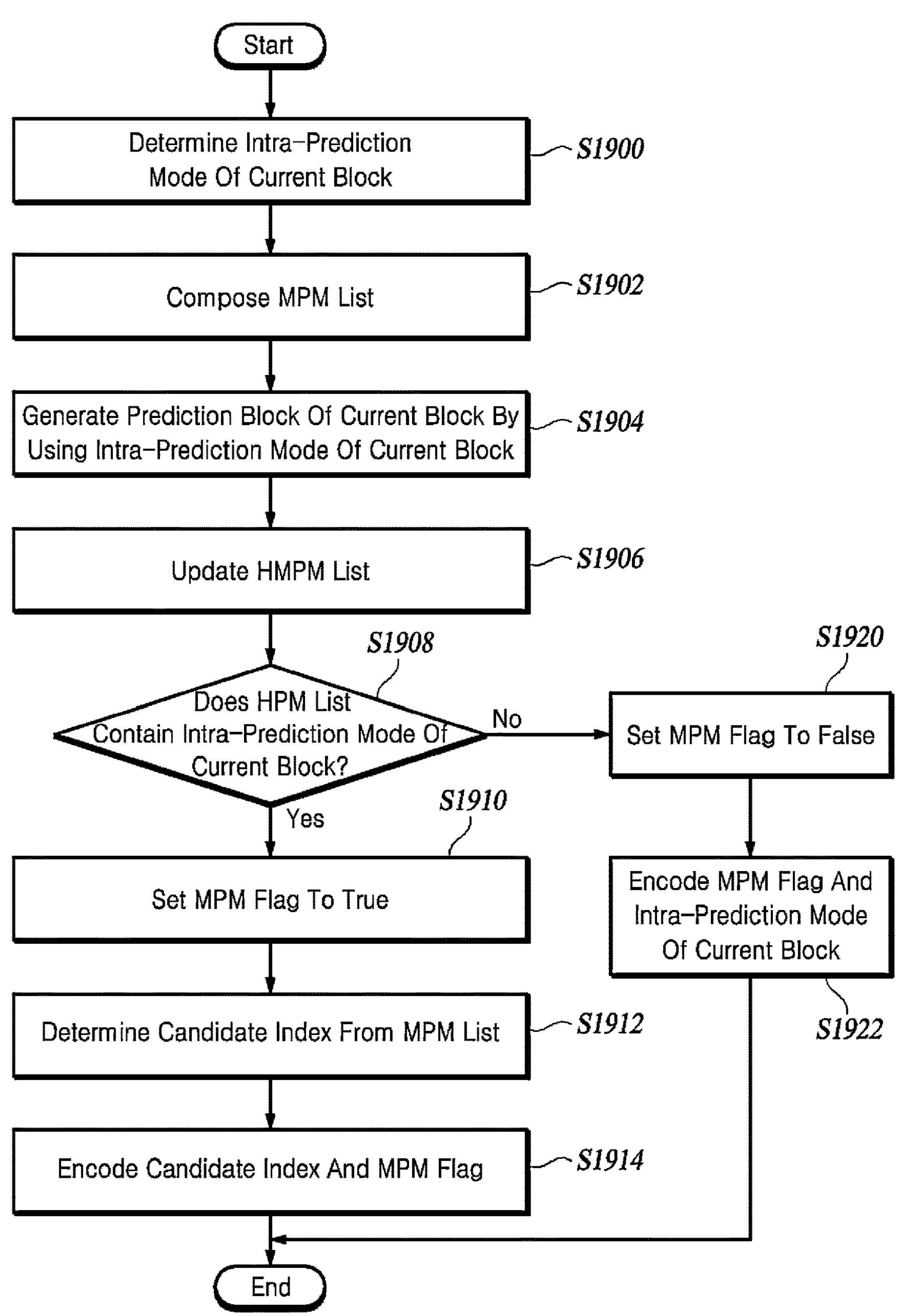
FIG. 19 is a flowchart of a method performed by the video encoding device for intra-predicting the current block, according to at least one embodiment of the present disclosure.
Figure 20:
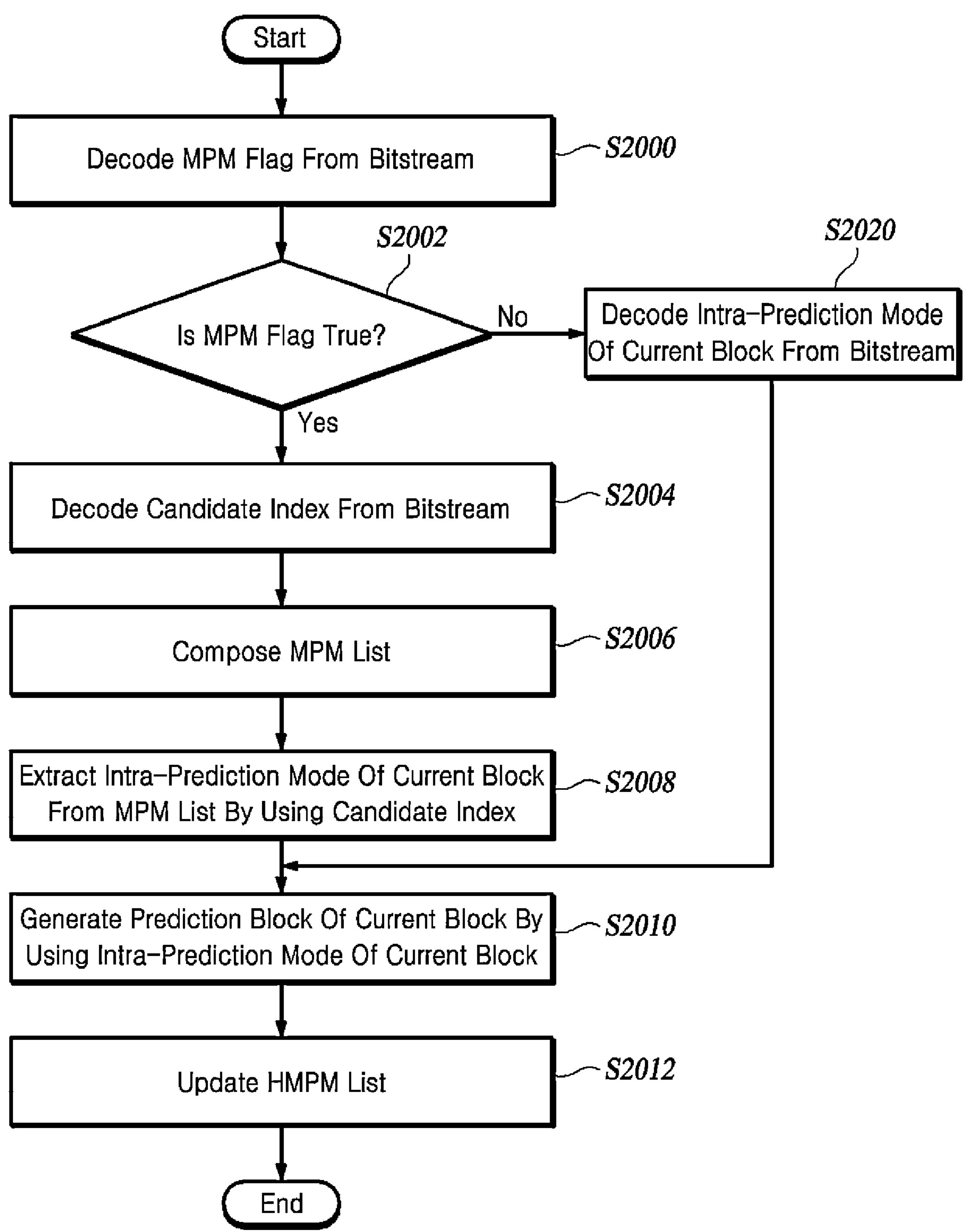
FIG. 20 is a flowchart of a method performed by the video decoding device for intra-predicting the current block, according to at least one embodiment of the present disclosure.

Referring now to FIGS. 19 and 20, a method is described for a video encoding device or a video decoding device to intra-predict the current block when utilizing an MPM list.

FIG. 19 is a flowchart of a method performed by the video encoding device for intra-predicting the current block, according to at least one embodiment of the present disclosure.

The video encoding device determines an intra-prediction mode for the current block (S1900). The video encoding device may determine the intra-prediction mode of the current block in terms of optimizing coding efficiency.

The video encoding device composes an MPM list by using the intra-prediction modes of the current block's neighboring blocks, the neighbor prediction modes, the HMPM list, and the default mode (S1902). Here, the neighbor prediction modes are generated by applying an offset to the directional modes of the intra-prediction modes of the neighboring blocks. Further, the default modes include a horizontal mode, a vertical mode, and a diagonal mode in the top-left direction.

For inter-predicted neighboring blocks, or for neighboring blocks incapable of using intra-prediction modes, the video encoding device may derive intra-prediction modes for those blocks according to Embodiment 2. If the intra-prediction modes of the neighboring blocks are non-usable, the video encoding device may derive the intra-prediction mode by using the neighboring reference samples of the current block according to Embodiment 2.

The video encoding device may take redundancy into account when composing the MPM list by using the intra-prediction modes described above.

The video encoding device generates a prediction block of the current block by using the intra-prediction mode of the current block (S1904).

The video encoding device updates the HMPM list by using the intra-prediction mode of the current block (S1906). The video encoding device may update the HMPM list according to Embodiment 1.

The video encoding device may check whether the MPM list includes the intra-prediction mode of the current block (S1908).

If the MPM list includes the intra-prediction mode of the current block (Yes in S1908), the video encoding device performs the following steps.

The video encoding device sets the MPM flag, indicating whether the MPM list is to be used, to true (S1910).

The video encoding device determines from the MPM list a candidate index that indicates the intra-prediction mode of the current block (S1912).

The video encoding device encodes the candidate index and the MPM flag (S1914).

If the MPM list does not include an intra-prediction mode of the current block (No in S1908), the video encoding device performs the following steps.

The video encoding device sets the MPM flag indicating whether the MPM list is to be used to false (S1920).

The video encoding device encodes the MPM flag and the intra-prediction mode of the current block (S1922).

FIG. 20 is a flowchart of a method performed by the video decoding device for intra-predicting the current block, according to at least one embodiment of the present disclosure.

The video decoding device decodes from the bitstream an MPM flag indicating whether the MPM list is enabled or disabled (S2000).

The video decoding device checks whether the MPM flag is true (S2002).

If the MPM flag is true (Yes in S2002), the video decoding device takes the following steps.

The video decoding device decodes a candidate index from the bitstream (S2004). Here, the candidate index indicates one of a plurality of candidate intra-prediction modes in the MPM list.

The video decoding device composes the MPM list by using the intra-prediction modes of the neighboring blocks of the current block, the neighbor prediction modes, the HMPM list, and the default modes (S2006). Here, the neighbor prediction modes are generated by applying an offset to the directional modes of the intra-prediction modes of the neighboring blocks. Furthermore, the default modes include a horizontal mode, a vertical mode, and a diagonal mode in the top-left direction.

For inter-predicted neighboring blocks, or for neighboring blocks incapable of using intra-prediction modes, the video decoding device may derive intra-prediction modes for those blocks according to Embodiment 2. If the intra-prediction modes of the neighboring blocks are non-usable, the video decoding device may derive the intra-prediction mode by using the neighboring reference samples of the current block according to Embodiment 2.

The video decoding device may take redundancy into account when composing the MPM list by using the intra-prediction modes described above.

The video decoding device extracts the intra-prediction mode of the current block from the MPM list by using the candidate index (S2008).

If the MPM flag is false (No in S2002), the video decoding device decodes the intra-prediction mode of the current block from the bitstream (S2020).

The video decoding device then generates a prediction block of the current block by using the intra-prediction mode of the current block (S2010).

The video decoding device updates the HMPM list by using the intra-prediction mode of the current block (S2012). The video decoding device may update the HMPM list according to Embodiment 1.

Hereinafter, with reference to FIGS. 21A and 22B, a method is described in which the video encoding device or video decoding device intra-predicts the current block when utilizing a secondary MPM list.

Figure 21A:
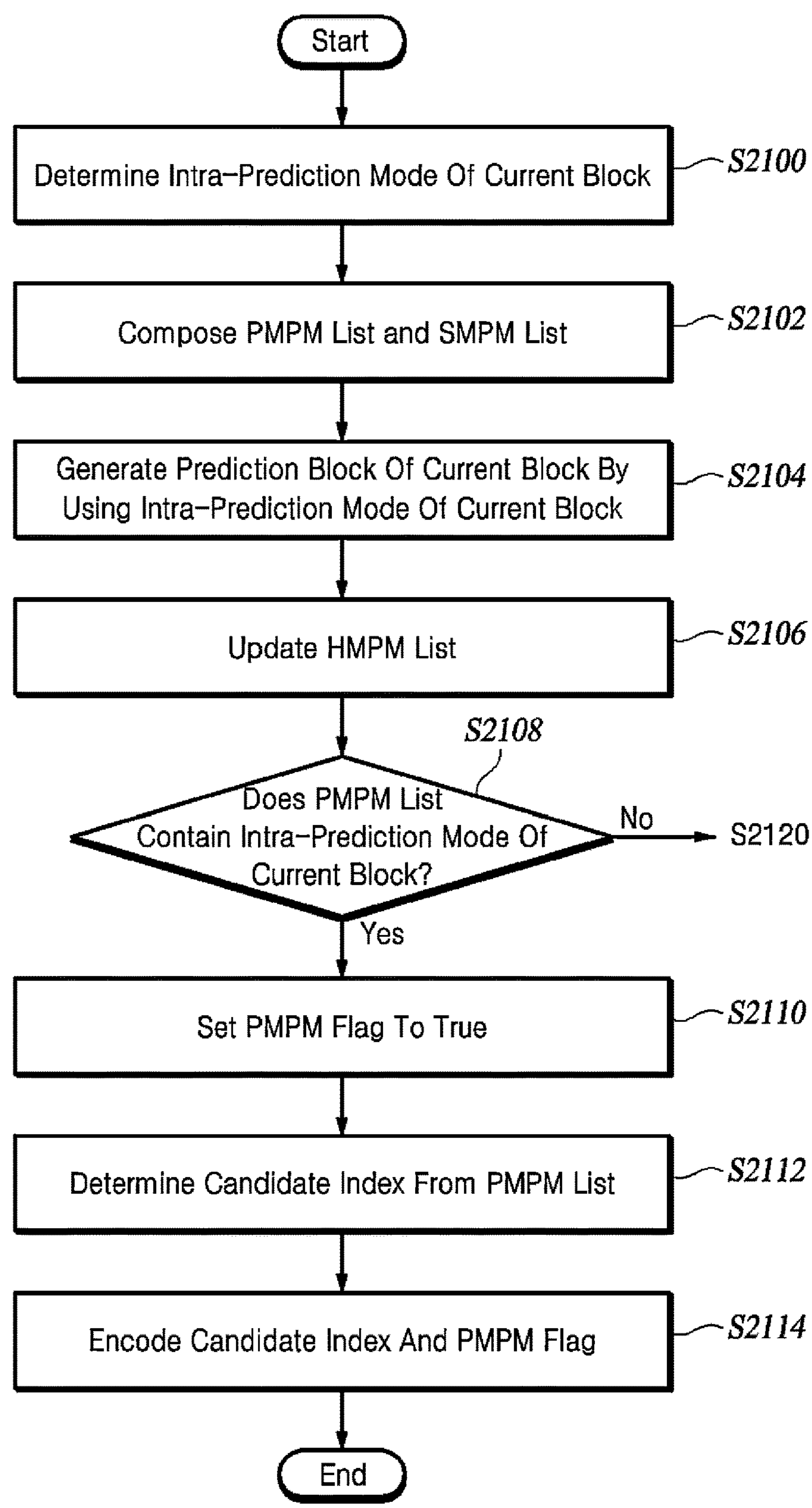
FIGS. 21A and 21B are a flowchart of a method performed by the video encoding device for intra-predicting the current block, according to another embodiment of the present disclosure.
Figure 21B:
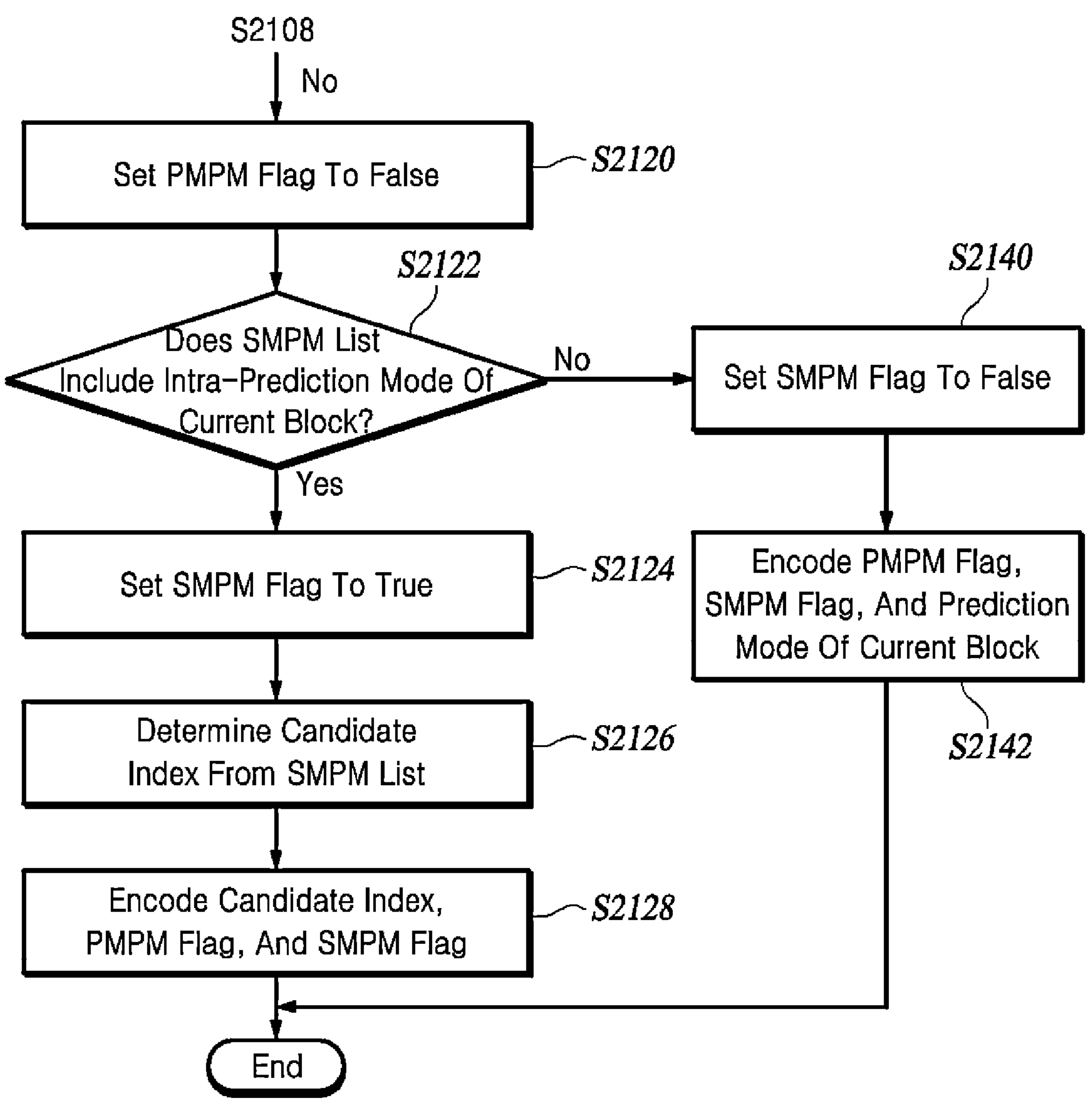

FIGS. 21A and 21B are a flowchart of a method performed by the video encoding device for intra-predicting the current block, according to another embodiment of the present disclosure.

The video encoding device determines an intra-prediction mode of the current block (S2100). The video encoding device may determine the intra-prediction mode of the current block in terms of optimizing coding efficiency.

The video encoding device composes the PMPM list and the SMPM list by using the intra-prediction modes of the neighboring blocks of the current block, the neighbor prediction modes, the HMPM list, and the default modes (S2102). Here, the neighbor prediction modes are generated by applying an offset to the directional modes of the intra-prediction modes of the neighboring blocks. Further, the default modes include a horizontal mode, a vertical mode, and a diagonal mode in the top-left direction.

For inter-predicted neighboring blocks, or for neighboring blocks incapable of using intra-prediction modes, the video encoding device may derive intra-prediction modes for those blocks according to Embodiment 2. If the intra-prediction modes of the neighboring blocks are non-usable, the video encoding device may derive the intra-prediction mode by using the neighboring reference samples of the current block according to Embodiment 2.

The video encoding device may take redundancy into account when composing the PMPM list and the SMPM list by using the intra-prediction modes described above.

The video encoding device may, after composing a single list as described above, split the list to generate the PMPM list and the SMPM list.

The video encoding device may generate a prediction block of the current block by using the intra-prediction mode of the current block (S2104).

The video encoding device updates the HMPM list by using the intra-prediction mode of the current block (S2106). The video encoding device may update the HMPM list according to Embodiment 1.

The video encoding device may check whether the PMPM list includes the intra-prediction mode of the current block (S2108).

If the PMPM list includes the intra-prediction mode of the current block (Yes in S2108), the video encoding device performs the following steps.

The video encoding device sets the PMPM flag indicating whether the PMPM list is enabled to true (S2110).

The video encoding device determines from the PMPM list a candidate index that indicates the intra-prediction mode of the current block (S2112).

The video encoding device encodes the candidate index and the PMPM flag (S2114).

If the PMPM list does not include the intra-prediction mode of the current block (No in S2108), the video encoding device sets the PMPM flag, indicating whether the PMPM list is enabled, to false (S2120) and checks whether the SMPM list includes the intra-prediction mode of the current block (S2122).

If the SMPM list includes the intra-prediction mode of the current block (Yes in S2122), the video encoding device performs the following steps.

The video encoding device sets the SMPM flag, indicating whether the SMPM list is enabled, to true (S2124).

The video encoding device determines from the SMPM list a candidate index that indicates the intra-prediction mode of the current block (S2126).

The video encoding device encodes the candidate index, the PMPM flag, and the SMPM flag (S2128).

If the SMPM list does not include the intra-prediction mode of the current block (No in S2122), the video encoding device performs the following steps.

The video encoding device sets the SMPM flag to false (S2140).

The video encoding device encodes the PMPM flag, the SMPM flag, and the intra-prediction mode of the current block (S2142).

Figure 22A:
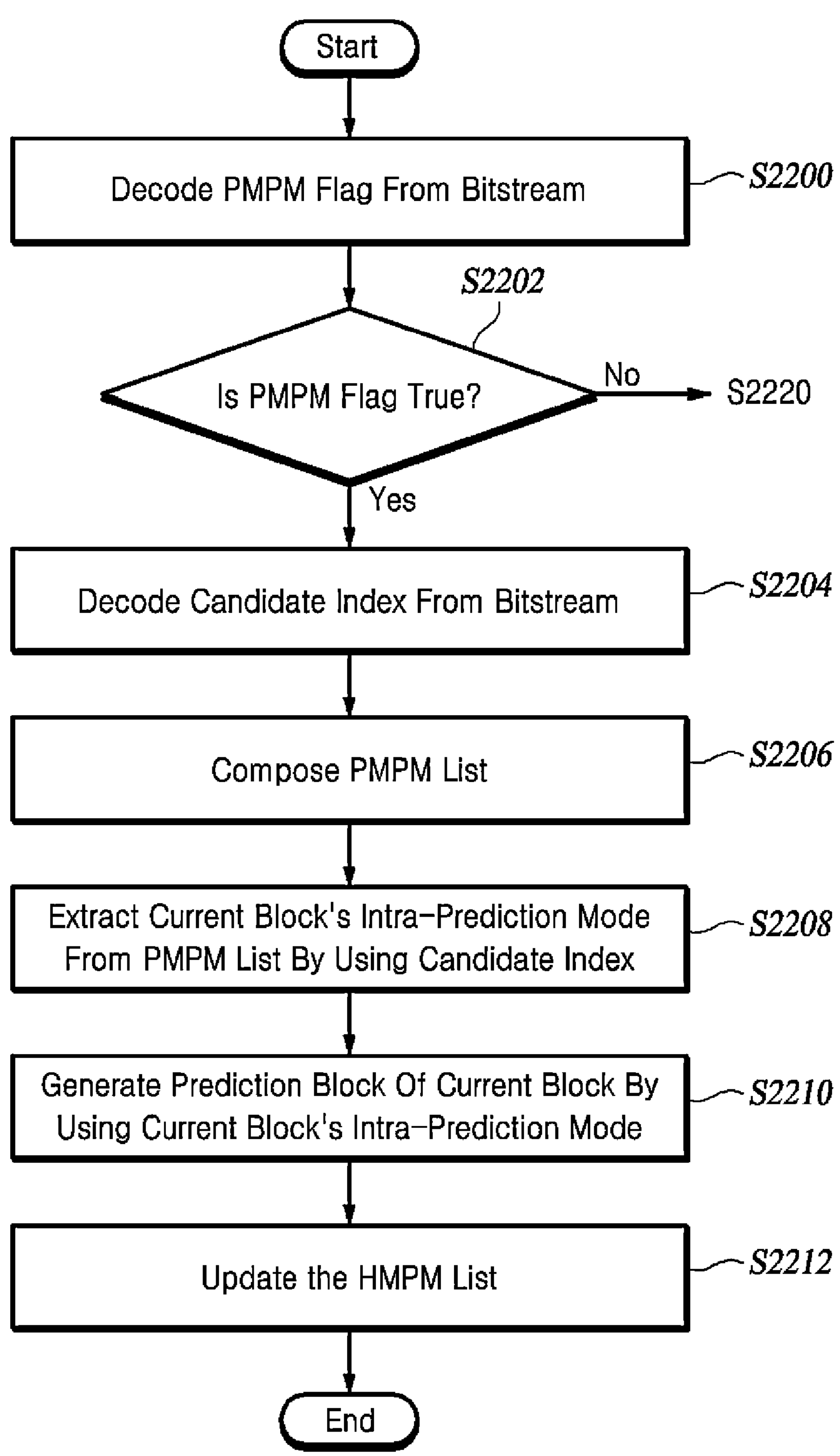
FIGS. 22A and 22B are a flowchart of a method performed by the video decoding device for intra-predicting the current block, according to another embodiment of the present disclosure.
Figure 22B:
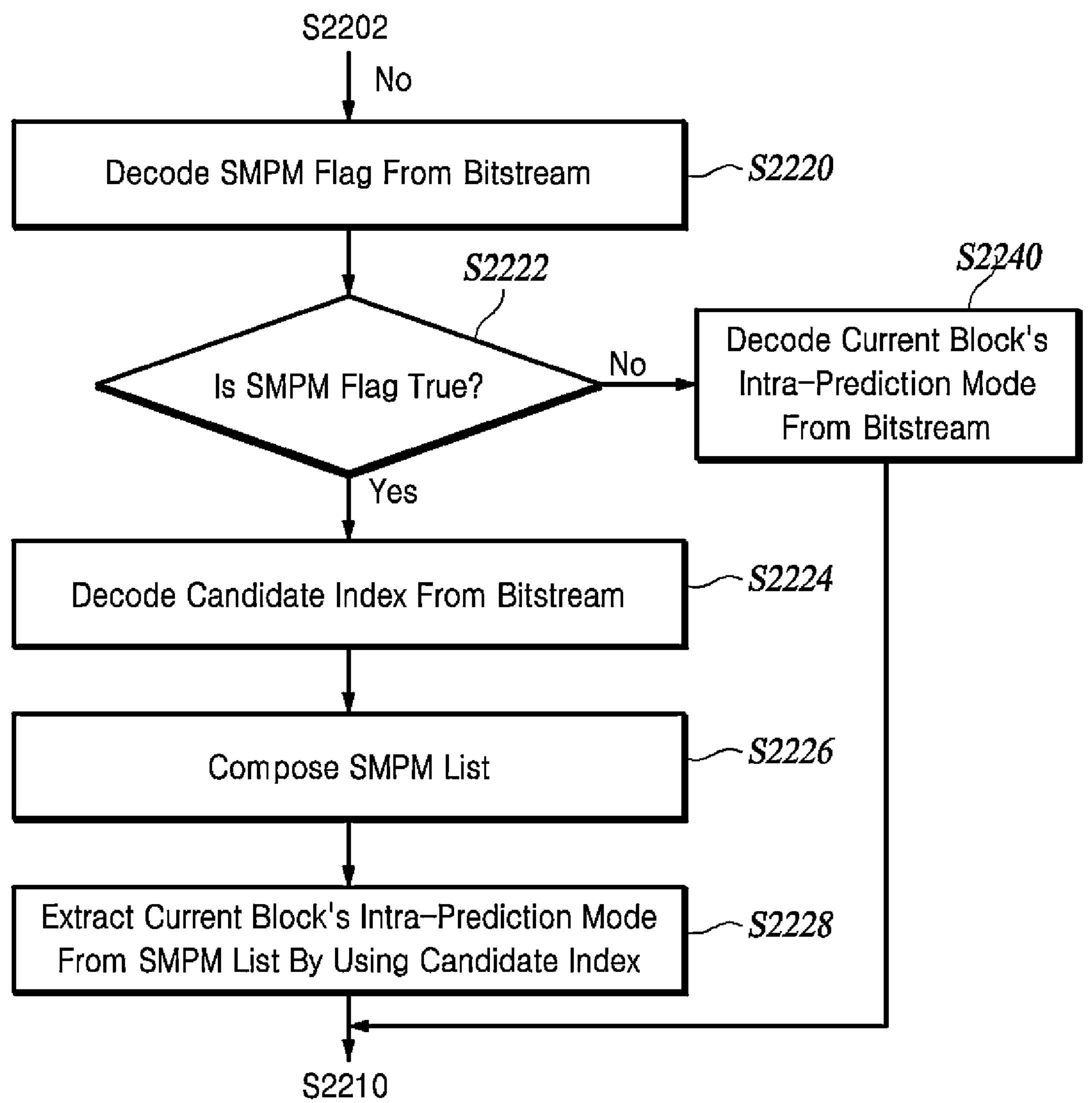

FIGS. 22A and 22B are a flowchart of a method performed by the video decoding device for intra-predicting the current block, according to another embodiment of the present disclosure.

The video decoding device decodes from the bitstream a PMPM flag indicating whether the PMPM list is enabled or disabled (S2200).

The video decoding device checks whether the PMPM flag is true (S2202).

If the PMPM flag is true (Yes in S2202), the video decoding device takes the following steps.

The video decoding device decodes a candidate index from the bitstream (S2204). Here, the candidate index indicates one of a plurality of candidate intra-prediction modes in the PMPM list.

The video decoding device composes a PMPM list by using the intra-prediction modes of the neighboring blocks of the current block, the neighbor prediction modes, the HMPM list, and the default mode (S2206). Here, the neighbor prediction modes are generated by applying an offset to the directional modes of the intra-prediction modes of the neighboring blocks. Further, the default modes include a horizontal mode, a vertical mode, and a diagonal mode in the top-left direction.

For inter-predicted neighboring blocks, or for neighboring blocks incapable of using intra-prediction modes, the video decoding device may derive intra-prediction modes for those blocks according to Embodiment 2. If the intra-prediction modes of the neighboring blocks are non-usable, the video decoding device may derive the intra-prediction mode by using the neighboring reference samples of the current block according to Embodiment 2.

The video decoding device may account for redundancy when composing the PMPM list by using the intra-prediction modes described above.

The video decoding device may, after composing a single list as described above, split the list to generate a PMPM list and an SMPM list.

The video decoding device extracts the intra-prediction mode of the current block from the PMPM list by using the candidate index (S2208).

The video decoding device then generates a prediction block of the current block by using the intra-prediction mode of the current block (S2210).

The video decoding device updates the HMPM list by using the intra-prediction mode of the current block (S2212). The video decoding device may update the HMPM list according to Embodiment 1.

If the PMPM flag is false (No in S2202), the video decoding device performs the following steps.

The video decoding device decodes from the bitstream the SMPM flag, which indicates whether the SMPM list is enabled or disabled (S2220).

The video decoding device checks whether the SMPM flag is true (S2222).

If the SMPM flag is true (Yes in S2222), the video decoding device performs the following steps.

The video decoding device decodes a candidate index from the bitstream (S2224). Here, the candidate index indicates one of a plurality of candidate intra-prediction modes in the SMPM list.

The video decoding device composes the SMPM list by using the intra-prediction modes of the neighboring blocks of the current block, the neighbor prediction modes, the HMPM list, and the default modes (S2226).

The video decoding device may consider redundancy when composing the SMPM list by using the intra-prediction modes described above.

Step S2226 may be omitted if, after composing the single list as described above, the PMPM list and the SMPM list are generated by splitting the list.

The video decoding device extracts the intra-prediction mode of the current block from the SMPM list by using the candidate index (S2228).

If the SMPM flag is false (No in S2222), the video decoding device decodes the intra-prediction mode of the current block from the bitstream (S2240).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

122: intra predictor
155: entropy encoder
510: entropy decoder
542: intra predictor

What is claimed is:

1. A method performed by a video decoding device for intra-predicting a current block, the method comprising:

decoding from a bitstream a candidate index that indicates one of a plurality of candidate intra-prediction modes in a most probable mode list (MPM list);

determining at least one reference region including neighboring reference samples of the current block;

deriving a gradient histogram for the at least one reference region;

deriving at least one intra-prediction mode of the at least one reference region based on the gradient histogram for the at least one reference region;

composing the MPM list by using intra-prediction modes of neighboring blocks of the current block, the at least one intra-prediction mode of the at least one reference region, default modes, and a shifted prediction mode that are generated by applying an offset to a directional mode among the intra-prediction modes of the neighboring blocks;

determining an intra-prediction mode of the current block from the MPM list by using the candidate index; and generating a prediction block of the current block by using the intra-prediction mode of the current block.

2. The method of claim 1, further comprising:

decoding from the bitstream a flag indicating whether the MPM list is to be used;

checking whether the flag is true; and in response to a determination that the flag is true, decoding the candidate index.

3. The method of claim 1, wherein composing the MPM list includes:

inserting, into the MPM list, the intra-prediction modes of a preset number of the neighboring blocks, and a preset number of the shifted prediction modes, taking into account redundancy; and when the MPM list is filled with the candidate intra-prediction modes that are less than a predetermined number, adding to the MPM list a preset number of prediction modes recently stored in the a history based MPM list (HMPM list), taking into account redundancy.

4. The method of claim 2, wherein composing the MPM list further includes:

adding the default modes to the MPM list, taking into account redundancy, when the MPM list is filled with the candidate intra-prediction modes that are less than a preset number.

5. The method of claim 1, further comprising:

updating a history based MPM list (HMPM list) by adding the intra-prediction mode of the current block to an end of the HMPM list based on a first-in-first-out (FIFO) structure.

6. The method of claim 5, wherein updating the HMPM list includes:

when the HMPM list has a size exceeding a preset size upon addition of the intra-prediction mode of the current block, and when the intra-prediction mode of the current block is present in the HMPM list, removing a duplicate prediction mode, moving stored prediction modes forward one by one from a corresponding position to a last position, and inserting the intra-prediction mode of the current block at an end of the HMPM list.

7. The method of claim 1, further comprising:

upon detection of a neighboring block incapable of using the intra-prediction modes:

composing a gradient histogram by using samples in the neighboring block; and deriving a directional mode having a largest histogram value in the gradient histogram to be an intra-prediction mode of the neighboring block, wherein composing the MPM list includes using a derived intra-prediction mode of the neighboring block to compose the MPM list.

8. A method performed by a video encoding device for intra-predicting a current block, the method comprising:

determining an intra-prediction mode of the current block;

determining at least one reference region including neighboring reference samples of the current block;

deriving a gradient histogram for the at least one reference region;

deriving at least one intra-prediction mode of the at least one reference region based on the gradient histogram for the at least one reference region;

composing a most probable mode list (MPM list) by using the intra-prediction modes of neighboring blocks of the current block, the at least one intra-prediction mode of the at least one reference region, default modes, and a shifted prediction mode that are generated by applying an offset to a directional mode among the intra-prediction modes of the neighboring blocks;

generating a prediction block of the current block by using the intra-prediction mode of the current block;

upon determining that the MPM list includes the intra-prediction mode of the current block, determining a candidate index indicating the intra-prediction mode of the current block based on the MPM list; and encoding the candidate index.

9. The method of claim 8, further comprising, when the MPM list includes the intra-prediction mode of the current block:

setting a flag, indicating whether the MPM list is to be used, to true; and encoding the flag.

10. A method for transmitting encoded video data containing a bitstream, the method comprising:

generating the bitstream for a current block in an image; and transmitting the bitstream, wherein generating the bitstream for the image comprises:

determining an intra-prediction mode of a current block;

determining at least one reference region including neighboring reference samples of the current block;

deriving a gradient histogram for the at least one reference region;

deriving at least one intra-prediction mode of the at least one reference region based on the gradient histogram for the at least one reference region;

composing a most probable mode list (MPM list) by using the intra-prediction modes of neighboring blocks of the current block, the at least one intra-prediction mode of the at least one reference region, default modes, and a shifted prediction mode that are generated by applying an offset to a directional mode among the intra-prediction modes of the neighboring blocks;

generating a prediction block of the current block by using the intra-prediction mode of the current block;

upon determining that the MPM list includes the intra-prediction mode of the current block, determining a candidate index indicating the intra-prediction mode of the current block based on the MPM list; and encoding the candidate index.

* * * * *